US009564004B2

(12) United States Patent
Johnson

(10) Patent No.: US 9,564,004 B2
(45) Date of Patent: Feb. 7, 2017

(54) CLOSED-LOOP SYSTEM FOR PROVIDING ADDITIONAL EVENT PARTICIPATION TO ELECTRONIC VIDEO GAME CUSTOMERS

(75) Inventor: Sam Johnson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1929 days.

(21) Appl. No.: 11/468,946

(22) Filed: Aug. 31, 2006

(65) Prior Publication Data

US 2007/0077997 A1 Apr. 5, 2007

Related U.S. Application Data

(63) Continuation-in-part of application No. 10/689,407, filed on Oct. 20, 2003, now Pat. No. 7,335,106.

(51) Int. Cl.
*A63F 13/00* (2014.01)
*G07F 17/32* (2006.01)

(52) U.S. Cl.
CPC .......... *G07F 17/3227* (2013.01); *G07F 17/32* (2013.01); *G07F 17/3234* (2013.01)

(58) Field of Classification Search
CPC . G07F 17/3227; G07F 17/323; G07F 17/3255
USPC ................ 463/1, 16, 21, 23, 25, 29, 42, 47; 273/138.1, 148 R, 459, 460; 705/1.1, 500
See application file for complete search history.

(56) References Cited

U.S. PATENT DOCUMENTS 3,534,963 A 10/1970 Weimer
3,708,219 A 1/1973 Forlini et al.
3,931,504 A 1/1976 Jacoby
4,004,097 A 1/1977 Spaulding
4,261,012 A 4/1981 Maloomian
4,333,715 A 6/1982 Brooks
4,357,624 A 11/1982 Greenberg
4,364,567 A 12/1982 Goott
4,430,728 A 2/1984 Beitel et al.
(Continued)

FOREIGN PATENT DOCUMENTS

AU 199650576 4/1997
AU 775882 8/2004
(Continued)

OTHER PUBLICATIONS

Jon Lafayette, Adds on VOD as Seen as Counter to Skipping, tvweek.com, www.tvweek.com/article.cms? articleID=26175, Oct. 4, 2004, 1 Page.

(Continued)

*Primary Examiner* — David L Lewis
*Assistant Examiner* — Robert Mosser
(74) *Attorney, Agent, or Firm* — Neal, Gerber & Eisenberg LLP

(57) ABSTRACT

The present invention provides a closed-loop system that allows the operator of video gaming machines or other systems to offer an event for customer participation, receive funding for participation in the event, and providing feedback regarding the results. More specifically, a video game customer may receive notification of an invitation to place a bet on an event, participate in a transaction, or otherwise receive information or interaction. The use can press buttons on the video gaming machine to indicate choices, provide funding, and placing bets on an event. The funding for such participation may be directly deducted from the customer's balance on the video gaming machine.

21 Claims, 7 Drawing Sheets

(56) References Cited

U.S. PATENT DOCUMENTS

| | | | | |
|---|---|---|---|---|
| 4,454,594 | A | | 6/1984 | Heffron et al. |
| 4,503,429 | A | | 3/1985 | Schreiber |
| 4,517,558 | A | | 5/1985 | Davids |
| 4,521,014 | A | | 6/1985 | Sitrick |
| 4,527,798 | A | | 7/1985 | Siekierski et al. |
| 4,607,844 | A | | 8/1986 | Fullerton |
| 4,621,814 | A | | 11/1986 | Stepan et al. |
| 4,659,182 | A | | 4/1987 | Aizawa |
| 4,694,490 | A | | 9/1987 | Harvey et al. |
| 4,704,725 | A | | 11/1987 | Harvey et al. |
| 4,710,873 | A | | 12/1987 | Breslow et al. |
| 4,718,672 | A | | 1/1988 | Okada |
| 4,743,002 | A | | 5/1988 | Menzel |
| 4,743,022 | A | | 5/1988 | Wood |
| 4,856,787 | A | | 8/1989 | Itkis |
| 4,911,449 | A | | 3/1990 | Dickinson et al. |
| 4,912,548 | A | | 3/1990 | Shanker et al. |
| 4,926,327 | A | | 5/1990 | Sidley |
| 4,965,825 | A | | 10/1990 | Harvey et al. |
| 5,086,354 | A | | 2/1992 | Bass et al. |
| 5,105,184 | A | | 4/1992 | Pirani et al. |
| 5,113,272 | A | | 5/1992 | Reamey |
| 5,121,477 | A | | 6/1992 | Koopmans et al. |
| 5,132,839 | A | | 7/1992 | Travis |
| 5,233,423 | A | | 8/1993 | Jernigan et al. |
| 5,319,491 | A | | 6/1994 | Selbrede |
| 5,342,047 | A | | 8/1994 | Heidel et al. |
| 5,364,100 | A | | 11/1994 | Ludlow et al. |
| 5,375,830 | A | | 12/1994 | Takemoto et al. |
| 5,376,587 | A | | 12/1994 | Buchmann et al. |
| 5,393,057 | A | | 2/1995 | Marnell, II |
| 5,393,061 | A | | 2/1995 | Manship et al. |
| 5,429,361 | A | | 7/1995 | Raven et al. |
| 5,467,893 | A | | 11/1995 | Landis, II et al. |
| 5,470,079 | A | | 11/1995 | LeStrange et al. |
| 5,477,952 | A | | 12/1995 | Castellano et al. |
| 5,531,441 | A | | 7/1996 | Dabrowski et al. |
| 5,539,547 | A | | 7/1996 | Ishii et al. |
| 5,553,864 | A | | 9/1996 | Sitrick |
| 5,559,312 | A | | 9/1996 | Lucero |
| 5,580,055 | A | | 12/1996 | Hagiwara |
| 5,585,821 | A | | 12/1996 | Ishikura et al. |
| 5,586,936 | A | | 12/1996 | Bennett et al. |
| 5,589,980 | A | | 12/1996 | Bass et al. |
| 5,613,912 | A | | 3/1997 | Slater |
| 5,643,086 | A | | 7/1997 | Alcorn et al. |
| 5,655,961 | A | | 8/1997 | Acres et al. |
| 5,678,679 | A | | 10/1997 | Berman |
| 5,740,549 | A | | 4/1998 | Reilly et al. |
| 5,745,197 | A | | 4/1998 | Leung et al. |
| 5,752,881 | A | | 5/1998 | Inoue |
| 5,761,647 | A | | 6/1998 | Boushy |
| 5,764,317 | A | | 6/1998 | Sadovnik et al. |
| 5,774,873 | A | | 6/1998 | Berent et al. |
| 5,785,592 | A | | 7/1998 | Jacobsen |
| 5,813,912 | A | | 9/1998 | Shultz |
| 5,816,918 | A | | 10/1998 | Kelly et al. |
| 5,830,065 | A | | 11/1998 | Sitrick |
| 5,851,149 | A | | 12/1998 | Xidos et al. |
| 5,887,243 | A | | 5/1999 | Grossman et al. |
| 5,907,321 | A | | 5/1999 | Grossman et al. |
| 5,910,046 | A | | 6/1999 | Wada et al. |
| 5,919,090 | A | | 7/1999 | Mothwurf |
| 5,923,307 | A | | 7/1999 | Hogle, IV |
| 5,941,772 | A | | 8/1999 | Paige |
| 5,951,397 | A | | 9/1999 | Dickinson |
| 5,956,180 | A | | 9/1999 | Bass et al. |
| 5,967,893 | A | | 10/1999 | Lawrence et al. |
| 5,971,271 | A | | 10/1999 | Wynn et al. |
| 5,980,384 | A | | 11/1999 | Barrie |
| 5,990,927 | A | | 11/1999 | Hendricks et al. |
| 6,001,016 | A | | 12/1999 | Walker et al. |
| 6,003,013 | A | | 12/1999 | Boushy et al. |
| 6,012,832 | A | | 1/2000 | Saunders et al. |
| 6,015,344 | A | | 1/2000 | Kelly et al. |
| 6,015,346 | A | | 1/2000 | Bennett |
| 6,027,115 | A | | 2/2000 | Griswold et al. |
| 6,036,601 | A | | 3/2000 | Heckel |
| 6,049,823 | A | | 4/2000 | Hwang |
| 6,050,895 | A | | 4/2000 | Luciano et al. |
| 6,054,969 | A | | 4/2000 | Haisma |
| 6,059,289 | A | | 5/2000 | Vancura |
| 6,059,658 | A | | 5/2000 | Mangano et al. |
| 6,068,552 | A | | 5/2000 | Walker et al. |
| 6,079,711 | A | | 6/2000 | Wei et al. |
| 6,089,975 | A | | 7/2000 | Dunn |
| 6,099,408 | A | | 8/2000 | Schneier et al. |
| 6,104,815 | A | | 8/2000 | Alcorn et al. |
| 6,106,396 | A | | 8/2000 | Alcorn et al. |
| 6,110,041 | A | | 8/2000 | Walker et al. |
| 6,113,495 | A | | 9/2000 | Walker et al. |
| 6,135,884 | A | | 10/2000 | Hedrick et al. |
| 6,142,876 | A | | 11/2000 | Cumbers |
| 6,149,522 | A | | 11/2000 | Alcorn et al. |
| 6,159,098 | A | | 12/2000 | Slomiany et al. |
| 6,175,358 | B1 | | 1/2001 | Scott-Jackson et al. |
| 6,186,893 | B1 | | 2/2001 | Walker et al. |
| 6,190,256 | B1 | | 2/2001 | Walker et al. |
| 6,203,428 | B1 | | 3/2001 | Giobbi et al. |
| 6,213,875 | B1 | | 4/2001 | Suzuki |
| 6,234,900 | B1 | | 5/2001 | Cumbers |
| 6,244,596 | B1 | | 6/2001 | Kondratjuk |
| 6,244,957 | B1 | * | 6/2001 | Walker et al. .................. 463/20 |
| 6,251,014 | B1 | | 6/2001 | Stockdale et al. |
| 6,252,707 | B1 | | 6/2001 | Kleinberger et al. |
| 6,253,119 | B1 | | 6/2001 | Dabrowski |
| 6,253,374 | B1 | | 6/2001 | Dresevic et al. |
| 6,254,481 | B1 | | 7/2001 | Jaffe |
| 6,263,258 | B1 | | 7/2001 | Dabrowski |
| 6,280,318 | B1 | | 8/2001 | Criss-Puszkiewicz |
| 6,280,326 | B1 | | 8/2001 | Saunders |
| 6,293,866 | B1 | | 9/2001 | Walker et al. |
| 6,302,793 | B1 | | 10/2001 | Fertitta, III et al. |
| 6,315,666 | B1 | | 11/2001 | Mastera et al. |
| 6,337,513 | B1 | | 1/2002 | Clevenger et al. |
| 6,347,996 | B1 | | 2/2002 | Gilmore et al. |
| 6,368,216 | B1 | | 4/2002 | Hedrick et al. |
| 6,375,567 | B1 | | 4/2002 | Acres |
| 6,379,244 | B1 | | 4/2002 | Sagawa et al. |
| 6,379,246 | B1 | | 4/2002 | Dabrowski |
| 6,379,247 | B1 | | 4/2002 | Walker et al. |
| 6,390,917 | B1 | | 5/2002 | Walker et al. |
| 6,398,220 | B1 | | 6/2002 | Inoue |
| 6,416,406 | B1 | | 7/2002 | Duhamel |
| 6,416,827 | B1 | | 7/2002 | Chakrapani et al. |
| 6,425,825 | B1 | | 7/2002 | Sitrick |
| 6,443,456 | B1 | | 9/2002 | Gajor |
| 6,444,496 | B1 | | 9/2002 | Edwards et al. |
| 6,445,185 | B1 | | 9/2002 | Damadian et al. |
| 6,446,257 | B1 | | 9/2002 | Pradhan et al. |
| 6,449,687 | B1 | | 9/2002 | Moriya |
| 6,453,319 | B1 | | 9/2002 | Mattis et al. |
| 6,454,648 | B1 | | 9/2002 | Kelly et al. |
| 6,459,440 | B1 | | 10/2002 | Monnes et al. |
| 6,460,848 | B1 | | 10/2002 | Soltys et al. |
| 6,491,583 | B1 | | 12/2002 | Gauselmann |
| 6,500,067 | B1 | | 12/2002 | Luciano et al. |
| 6,503,147 | B1 | | 1/2003 | Stockdale et al. |
| 6,508,710 | B1 | | 1/2003 | Paravia et al. |
| 6,511,375 | B1 | | 1/2003 | Kaminkow |
| 6,512,559 | B1 | | 1/2003 | Hashimoto et al. |
| 6,514,141 | B1 | | 2/2003 | Kaminkow et al. |
| 6,517,433 | B2 | | 2/2003 | Loose et al. |
| 6,517,435 | B2 | | 2/2003 | Soltys et al. |
| 6,517,436 | B2 | | 2/2003 | Soltys et al. |
| 6,517,437 | B1 | | 2/2003 | Wells et al. |
| 6,520,857 | B2 | | 2/2003 | Soltys et al. |
| 6,527,271 | B2 | | 3/2003 | Soltys et al. |
| 6,530,836 | B2 | | 3/2003 | Soltys et al. |
| 6,530,837 | B2 | | 3/2003 | Soltys et al. |
| 6,533,276 | B2 | | 3/2003 | Soltys et al. |
| 6,533,662 | B2 | | 3/2003 | Soltys et al. |
| 6,540,609 | B1 | | 4/2003 | Paige |
| 6,547,664 | B2 | | 4/2003 | Saunders |

(56) References Cited

U.S. PATENT DOCUMENTS

| | | | |
|---|---|---|---|
| 6,575,541 | B1 | 6/2003 | Hedrick et al. |
| 6,579,179 | B2 | 6/2003 | Poole et al. |
| 6,579,180 | B2 | 6/2003 | Soltys et al. |
| 6,579,181 | B2 | 6/2003 | Soltys et al. |
| 6,582,310 | B1 | 6/2003 | Walker et al. |
| 6,585,591 | B1 | 7/2003 | Baerlocher et al. |
| 6,592,456 | B2 | 7/2003 | Walker et al. |
| 6,595,857 | B2 | 7/2003 | Soltys et al. |
| 6,598,788 | B1 | 7/2003 | Dabrowski |
| 6,620,046 | B2 | 9/2003 | Rowe |
| 6,620,047 | B1 | 9/2003 | Alcorn et al. |
| D480,961 | S | 10/2003 | Deadman |
| 6,638,163 | B2 | 10/2003 | Moody |
| 6,641,483 | B1 | 11/2003 | Luciano |
| 6,645,068 | B1 | 11/2003 | Petermeier et al. |
| 6,645,077 | B2 | 11/2003 | Rowe |
| 6,646,695 | B1 | 11/2003 | Gauselmann |
| 6,648,757 | B1 | 11/2003 | Slomiany et al. |
| 6,652,378 | B2 | 11/2003 | Cannon et al. |
| 6,652,380 | B1 | 11/2003 | Luciano |
| 6,659,864 | B2 | 12/2003 | McGahn et al. |
| 6,661,425 | B1 | 12/2003 | Hiroaki |
| 6,663,490 | B2 | 12/2003 | Soltys et al. |
| 6,672,589 | B1 | 1/2004 | Lemke et al. |
| 6,676,515 | B1 | 1/2004 | Baltz et al. |
| 6,679,775 | B1 | 1/2004 | Luciano et al. |
| 6,682,423 | B2 | 1/2004 | Brosnan et al. |
| 6,685,559 | B2 | 2/2004 | Luciano et al. |
| 6,695,703 | B1 | 2/2004 | McGahn |
| 6,702,675 | B2 | 3/2004 | Poole et al. |
| 6,712,694 | B1 | 3/2004 | Nordman |
| 6,712,696 | B2 | 3/2004 | Soltys et al. |
| 6,712,698 | B2 | 3/2004 | Paulsen et al. |
| 6,715,756 | B2 | 4/2004 | Inoue |
| 6,717,728 | B2 | 4/2004 | Putilin |
| 6,722,978 | B2 | 4/2004 | Valenti |
| 6,722,979 | B2 | 4/2004 | Gilmore et al. |
| 6,729,956 | B2 | 5/2004 | Wolf et al. |
| 6,743,095 | B2 | 6/2004 | Cole et al. |
| 6,749,510 | B2 | 6/2004 | Giobbi |
| 6,758,751 | B2 | 7/2004 | Soltys et al. |
| 6,769,984 | B2 | 8/2004 | Duhamel et al. |
| 6,800,029 | B2 | 10/2004 | Rowe et al. |
| 6,802,777 | B2 | 10/2004 | Seelig et al. |
| 6,811,486 | B1 | 11/2004 | Luciano, Jr. |
| 6,817,945 | B2 | 11/2004 | Seelig et al. |
| 6,817,946 | B2 | 11/2004 | Motegi et al. |
| 6,843,723 | B2 | 1/2005 | Joshi |
| 6,848,995 | B1 | 2/2005 | Walker et al. |
| 6,852,029 | B2 | 2/2005 | Baltz et al. |
| 6,863,611 | B1 | 3/2005 | Morrow et al. |
| 6,884,174 | B2 | 4/2005 | Lundy et al. |
| 6,887,157 | B2 | 5/2005 | LeMay et al. |
| 6,890,256 | B2 | 5/2005 | Walker et al. |
| 6,890,259 | B2 | 5/2005 | Breckner et al. |
| 6,896,618 | B2 | 5/2005 | Benoy et al. |
| 6,906,762 | B1 | 6/2005 | Witehira et al. |
| 6,908,384 | B1 | 6/2005 | Luciano, Jr. |
| 6,916,246 | B1 | 7/2005 | Luciano, Jr. |
| 6,924,903 | B2 | 8/2005 | Brooks et al. |
| 6,935,946 | B2 | 8/2005 | Yoseloff |
| 6,937,298 | B2 | 8/2005 | Okada |
| 6,942,574 | B1 | 9/2005 | LeMay et al. |
| 6,958,014 | B1 | 10/2005 | Luciano, Jr. et al. |
| 6,969,319 | B2 | 11/2005 | Rowe et al. |
| 6,984,174 | B2 | 1/2006 | Cannon et al. |
| 6,991,543 | B2 | 1/2006 | Joshi |
| 7,004,837 | B1 | 2/2006 | Crowder, Jr. et al. |
| 7,022,017 | B1 | 4/2006 | Halbritter et al. |
| 7,025,676 | B2 | 4/2006 | Cole et al. |
| 7,063,617 | B2 | 6/2006 | Brosnan et al. |
| 7,070,503 | B2 | 7/2006 | Rudolph |
| 7,094,149 | B2 | 8/2006 | Walker et al. |
| 7,095,180 | B2 | 8/2006 | Emslie et al. |
| 7,097,560 | B2 | 8/2006 | Okada |
| 7,112,138 | B2 | 9/2006 | Hedrick et al. |
| 7,118,479 | B2 | 10/2006 | D'Amico et al. |
| 7,128,647 | B2 | 10/2006 | Muir et al. |
| 7,137,889 | B1 | 11/2006 | Luciano |
| 7,137,892 | B2 | 11/2006 | Sitrick |
| 7,159,865 | B2 | 1/2007 | Okada |
| 7,160,187 | B2 | 1/2007 | Loose et al. |
| 7,204,753 | B2 | 4/2007 | Ozaki et al. |
| 7,207,883 | B2 | 4/2007 | Nozaki et al. |
| 7,220,181 | B2 | 5/2007 | Okada |
| 7,241,219 | B2 | 7/2007 | Walker et al. |
| 7,252,288 | B2 | 8/2007 | Seelig et al. |
| 7,255,351 | B2 | 8/2007 | Yoseloff et al. |
| 7,255,643 | B2 | 8/2007 | Ozaki et al. |
| 7,285,049 | B1 | 10/2007 | Luciano, Jr. et al. |
| 7,290,072 | B2 | 10/2007 | Quraishi et al. |
| 7,297,062 | B2 | 11/2007 | Gatto et al. |
| 7,309,284 | B2 | 12/2007 | Griswold et al. |
| 7,322,884 | B2 | 1/2008 | Emori et al. |
| 7,322,885 | B1 | 1/2008 | Luciano, Jr. et al. |
| 7,329,181 | B2 | 2/2008 | Hoshino et al. |
| 7,357,714 | B2 | 4/2008 | Tessmer et al. |
| 7,392,470 | B2 | 6/2008 | Kammler |
| 7,473,179 | B2 | 1/2009 | Xidos et al. |
| 7,520,810 | B2 | 4/2009 | Dabrowski |
| 7,618,319 | B2 | 11/2009 | Casey et al. |
| 7,619,585 | B2 | 11/2009 | Bell et al. |
| 7,674,177 | B2 | 3/2010 | Cole et al. |
| 7,704,147 | B2 | 4/2010 | Quraishi et al. |
| 7,730,413 | B1 | 6/2010 | Engel et al. |
| 7,771,271 | B2 | 8/2010 | Walker et al. |
| 7,819,750 | B2 | 10/2010 | Lam et al. |
| 7,827,488 | B2 | 11/2010 | Sitrick |
| 7,867,086 | B2 | 1/2011 | Sitrick |
| 7,918,734 | B2 | 4/2011 | Gould |
| 8,029,351 | B2 | 10/2011 | Kosaka et al. |
| 8,131,649 | B2 | 3/2012 | Yen et al. |
| 8,133,102 | B2 | 3/2012 | Dabrowski |
| 2001/0013681 | A1 | 8/2001 | Bruzzese et al. |
| 2002/0016202 | A1 | 2/2002 | Fertitta et al. |
| 2002/0025850 | A1 | 2/2002 | Hafezi |
| 2002/0045472 | A1 | 4/2002 | Adams |
| 2002/0142825 | A1 | 10/2002 | Lark et al. |
| 2002/0142841 | A1 | 10/2002 | Boushy |
| 2002/0142846 | A1 | 10/2002 | Paulsen |
| 2002/0147047 | A1 | 10/2002 | Letovsky et al. |
| 2002/0155891 | A1 | 10/2002 | Okada et al. |
| 2002/0169021 | A1 | 11/2002 | Urie et al. |
| 2002/0173354 | A1 | 11/2002 | Winans et al. |
| 2002/0177479 | A1 | 11/2002 | Walker et al. |
| 2002/0177480 | A1 | 11/2002 | Rowe |
| 2002/0183105 | A1 | 12/2002 | Cannon et al. |
| 2002/0194505 | A1 | 12/2002 | Muschenborn |
| 2002/0198044 | A1 | 12/2002 | Walker et al. |
| 2003/0004871 | A1 | 1/2003 | Rowe |
| 2003/0013512 | A1 | 1/2003 | Rowe |
| 2003/0013513 | A1 | 1/2003 | Rowe |
| 2003/0013516 | A1 | 1/2003 | Walker et al. |
| 2003/0013527 | A1 | 1/2003 | Rowe et al. |
| 2003/0027624 | A1 | 2/2003 | Gilmore et al. |
| 2003/0027631 | A1 | 2/2003 | Hedrick et al. |
| 2003/0032474 | A1 | 2/2003 | Kaminkow |
| 2003/0032478 | A1 | 2/2003 | Takahama et al. |
| 2003/0032479 | A1 | 2/2003 | LeMay et al. |
| 2003/0036425 | A1 | 2/2003 | Kaminkow et al. |
| 2003/0054868 | A1 | 3/2003 | Paulsen et al. |
| 2003/0054880 | A1 | 3/2003 | Lam et al. |
| 2003/0054881 | A1 | 3/2003 | Hedrick et al. |
| 2003/0064771 | A1 | 4/2003 | Morrow et al. |
| 2003/0064800 | A1 | 4/2003 | Jackson et al. |
| 2003/0064801 | A1 | 4/2003 | Breckner |
| 2003/0069074 | A1 | 4/2003 | Jackson |
| 2003/0083943 | A1 | 5/2003 | Adams et al. |
| 2003/0087690 | A1 | 5/2003 | Loose et al. |
| 2003/0096645 | A1 | 5/2003 | Soltys et al. |
| 2003/0100359 | A1 | 5/2003 | Loose et al. |
| 2003/0119579 | A1 | 6/2003 | Walker et al. |
| 2003/0130028 | A1 | 7/2003 | Aida et al. |
| 2003/0139214 | A1 | 7/2003 | Wolf et al. |

(56) References Cited

U.S. PATENT DOCUMENTS

| | | | |
|---|---|---|---|
| 2003/0149619 | A1 | 8/2003 | Stanley et al. |
| 2003/0162582 | A1 | 8/2003 | Gordon |
| 2003/0162588 | A1 | 8/2003 | Brosnan et al. |
| 2003/0176214 | A1 | 9/2003 | Burak et al. |
| 2003/0187736 | A1 | 10/2003 | Teague et al. |
| 2003/0195036 | A1 | 10/2003 | Poole et al. |
| 2003/0207711 | A1 | 11/2003 | Rowe |
| 2003/0216169 | A1 | 11/2003 | Walker et al. |
| 2003/0216966 | A1 | 11/2003 | Saenz et al. |
| 2003/0222876 | A1 | 12/2003 | Giemborek et al. |
| 2003/0232647 | A1 | 12/2003 | Moser |
| 2003/0236114 | A1 | 12/2003 | Griswold et al. |
| 2004/0009813 | A1 | 1/2004 | Wind |
| 2004/0023714 | A1 | 2/2004 | Asdale |
| 2004/0024608 | A1 | 2/2004 | Saenz et al. |
| 2004/0029636 | A1 | 2/2004 | Wells |
| 2004/0032086 | A1 | 2/2004 | Barragan |
| 2004/0038735 | A1 | 2/2004 | Steil |
| 2004/0039679 | A1 | 2/2004 | Norton et al. |
| 2004/0039695 | A1 | 2/2004 | Rowe |
| 2004/0043814 | A1 | 3/2004 | Angell et al. |
| 2004/0048671 | A1 | 3/2004 | Rowe |
| 2004/0053663 | A1 | 3/2004 | Paulsen |
| 2004/0063490 | A1 | 4/2004 | Okada |
| 2004/0066475 | A1 | 4/2004 | Searle |
| 2004/0077408 | A1 | 4/2004 | D'Amico et al. |
| 2004/0087360 | A1 | 5/2004 | Chamberlain et al. |
| 2004/0092303 | A1 | 5/2004 | George et al. |
| 2004/0092315 | A1 | 5/2004 | Boyd et al. |
| 2004/0103444 | A1 | 5/2004 | Weinberg et al. |
| 2004/0106449 | A1 | 6/2004 | Walker et al. |
| 2004/0110557 | A1 | 6/2004 | Rowe |
| 2004/0113360 | A1 | 6/2004 | George et al. |
| 2004/0116178 | A1 | 6/2004 | Okada |
| 2004/0117484 | A1 | 6/2004 | Singer et al. |
| 2004/0127284 | A1* | 7/2004 | Walker et al. .................. 463/30 |
| 2004/0132531 | A1 | 7/2004 | George et al. |
| 2004/0132532 | A1 | 7/2004 | Brosnan et al. |
| 2004/0142739 | A1 | 7/2004 | Loose et al. |
| 2004/0143496 | A1 | 7/2004 | Saenz |
| 2004/0147303 | A1 | 7/2004 | Imura et al. |
| 2004/0150162 | A1 | 8/2004 | Okada |
| 2004/0162146 | A1 | 8/2004 | Ooto |
| 2004/0166925 | A1 | 8/2004 | Emori et al. |
| 2004/0171423 | A1 | 9/2004 | Silva et al. |
| 2004/0180712 | A1 | 9/2004 | Forman et al. |
| 2004/0180721 | A1 | 9/2004 | Rowe |
| 2004/0183972 | A1 | 9/2004 | Bell |
| 2004/0192430 | A1 | 9/2004 | Burak et al. |
| 2004/0198485 | A1 | 10/2004 | Loose |
| 2004/0207154 | A1 | 10/2004 | Okada |
| 2004/0208126 | A1 | 10/2004 | Wassew et al. |
| 2004/0209666 | A1 | 10/2004 | Tashiro et al. |
| 2004/0209667 | A1 | 10/2004 | Emori et al. |
| 2004/0209668 | A1 | 10/2004 | Okada |
| 2004/0209671 | A1 | 10/2004 | Okada |
| 2004/0209674 | A1 | 10/2004 | Conover et al. |
| 2004/0209678 | A1 | 10/2004 | Okada |
| 2004/0209683 | A1 | 10/2004 | Okada |
| 2004/0214622 | A1 | 10/2004 | Atkinson |
| 2004/0214635 | A1 | 10/2004 | Okada |
| 2004/0214637 | A1 | 10/2004 | Nonaka |
| 2004/0219968 | A1 | 11/2004 | Fiden et al. |
| 2004/0219975 | A1 | 11/2004 | Soltys et al. |
| 2004/0224747 | A1 | 11/2004 | Okada |
| 2004/0233663 | A1 | 11/2004 | Emslie et al. |
| 2004/0239582 | A1 | 12/2004 | Seymour |
| 2004/0254006 | A1 | 12/2004 | Lam et al. |
| 2004/0254009 | A1 | 12/2004 | D'Amico et al. |
| 2004/0254010 | A1 | 12/2004 | Fine |
| 2004/0254013 | A1 | 12/2004 | Quraishi et al. |
| 2004/0254014 | A1 | 12/2004 | Quraishi et al. |
| 2005/0003890 | A1 | 1/2005 | Hedrick et al. |
| 2005/0009600 | A1 | 1/2005 | Rowe et al. |
| 2005/0013527 | A1 | 1/2005 | Doyle et al. |
| 2005/0014558 | A1 | 1/2005 | Estey |
| 2005/0020348 | A1 | 1/2005 | Thomas et al. |
| 2005/0020358 | A1 | 1/2005 | Cram |
| 2005/0027381 | A1 | 2/2005 | George et al. |
| 2005/0032571 | A1 | 2/2005 | Asonuma |
| 2005/0032575 | A1 | 2/2005 | Goforth et al. |
| 2005/0037837 | A1 | 2/2005 | Rowe |
| 2005/0037843 | A1 | 2/2005 | Wells et al. |
| 2005/0043086 | A1 | 2/2005 | Schneider |
| 2005/0049032 | A1 | 3/2005 | Kobayashi |
| 2005/0049046 | A1 | 3/2005 | Kobayashi |
| 2005/0054439 | A1 | 3/2005 | Rowe et al. |
| 2005/0054446 | A1 | 3/2005 | Kammler et al. |
| 2005/0059449 | A1 | 3/2005 | Yarbrough |
| 2005/0059457 | A1 | 3/2005 | Rothschild et al. |
| 2005/0059466 | A1 | 3/2005 | Yarbrough |
| 2005/0059480 | A1 | 3/2005 | Soukup et al. |
| 2005/0059485 | A1 | 3/2005 | Paulsen et al. |
| 2005/0059494 | A1 | 3/2005 | Kammler |
| 2005/0062410 | A1 | 3/2005 | Bell et al. |
| 2005/0063055 | A1 | 3/2005 | Engel |
| 2005/0075165 | A1 | 4/2005 | George et al. |
| 2005/0075889 | A1 | 4/2005 | Gomes et al. |
| 2005/0079913 | A1 | 4/2005 | Inamura |
| 2005/0085292 | A1 | 4/2005 | Inamura |
| 2005/0085300 | A1 | 4/2005 | Johnson |
| 2005/0096112 | A1 | 5/2005 | Guinn, Jr. et al. |
| 2005/0096129 | A1 | 5/2005 | Walker et al. |
| 2005/0101387 | A1 | 5/2005 | Wolf |
| 2005/0119044 | A1 | 6/2005 | Lim et al. |
| 2005/0119048 | A1 | 6/2005 | Soltys et al. |
| 2005/0119052 | A1 | 6/2005 | Russell et al. |
| 2005/0137011 | A1 | 6/2005 | Walker et al. |
| 2005/0143166 | A1 | 6/2005 | Walker et al. |
| 2005/0153768 | A1 | 7/2005 | Paulsen |
| 2005/0153772 | A1 | 7/2005 | Griswold et al. |
| 2005/0153773 | A1 | 7/2005 | Nguyen et al. |
| 2005/0153775 | A1 | 7/2005 | Griswold et al. |
| 2005/0153776 | A1 | 7/2005 | LeMay et al. |
| 2005/0164762 | A1 | 7/2005 | Smith et al. |
| 2005/0170883 | A1 | 8/2005 | Muskin |
| 2005/0170892 | A1 | 8/2005 | Atkinson |
| 2005/0171808 | A1 | 8/2005 | Saenz et al. |
| 2005/0182647 | A1 | 8/2005 | Saenz et al. |
| 2005/0187012 | A1 | 8/2005 | Walker et al. |
| 2005/0192090 | A1 | 9/2005 | Muir et al. |
| 2005/0193269 | A1 | 9/2005 | Haswell et al. |
| 2005/0197183 | A1 | 9/2005 | Walker et al. |
| 2005/0206582 | A1 | 9/2005 | Bell et al. |
| 2005/0208994 | A1 | 9/2005 | Berman |
| 2005/0215310 | A1 | 9/2005 | Boyd et al. |
| 2005/0215311 | A1 | 9/2005 | Hornik et al. |
| 2005/0215316 | A1 | 9/2005 | Rowe et al. |
| 2005/0233799 | A1 | 10/2005 | LeMay et al. |
| 2005/0239539 | A1 | 10/2005 | Inamura |
| 2005/0266912 | A1 | 12/2005 | Sekiguchi |
| 2005/0282638 | A1 | 12/2005 | Rowe |
| 2005/0285337 | A1 | 12/2005 | Durham et al. |
| 2006/0009273 | A2 | 1/2006 | Moshal |
| 2006/0019747 | A1 | 1/2006 | Loose et al. |
| 2006/0025198 | A1 | 2/2006 | Gail et al. |
| 2006/0025199 | A1 | 2/2006 | Harkins et al. |
| 2006/0025206 | A1 | 2/2006 | Walker et al. |
| 2006/0041586 | A1 | 2/2006 | Nassef, Jr. |
| 2006/0046819 | A1 | 3/2006 | Nguyen et al. |
| 2006/0063581 | A1 | 3/2006 | Harris et al. |
| 2006/0068898 | A1 | 3/2006 | Maya |
| 2006/0068906 | A1 | 3/2006 | Morrow et al. |
| 2006/0073870 | A1 | 4/2006 | Cannon |
| 2006/0079309 | A1 | 4/2006 | Walker et al. |
| 2006/0079333 | A1 | 4/2006 | Morrow et al. |
| 2006/0084488 | A1 | 4/2006 | Kinsley et al. |
| 2006/0089194 | A1 | 4/2006 | Joshi et al. |
| 2006/0094508 | A1 | 5/2006 | D'Amico et al. |
| 2006/0100014 | A1 | 5/2006 | Griswold et al. |
| 2006/0103951 | A1 | 5/2006 | Bell et al. |
| 2006/0105837 | A1 | 5/2006 | Walker et al. |
| 2006/0105841 | A1 | 5/2006 | Rom et al. |
| 2006/0125745 | A1 | 6/2006 | Evanicky |

(56) References Cited

U.S. PATENT DOCUMENTS

| | | | |
|---|---|---|---|
| 2006/0135230 | A1 | 6/2006 | Godse et al. |
| 2006/0135255 | A1 | 6/2006 | Roth |
| 2006/0143085 | A1 | 6/2006 | Adams et al. |
| 2006/0154719 | A1 | 7/2006 | Okuniewicz |
| 2006/0154721 | A1 | 7/2006 | Okuniewicz |
| 2006/0154729 | A1 | 7/2006 | LeMay et al. |
| 2006/0166727 | A1 | 7/2006 | Burak |
| 2006/0178208 | A1 | 8/2006 | Cole |
| 2006/0184626 | A1 | 8/2006 | Agapi et al. |
| 2006/0190482 | A1 | 8/2006 | Kishan et al. |
| 2006/0191177 | A1 | 8/2006 | Engel |
| 2006/0211477 | A1 | 9/2006 | Walker et al. |
| 2006/0217202 | A1 | 9/2006 | Burke et al. |
| 2006/0247027 | A1 | 11/2006 | Walker et al. |
| 2006/0252504 | A1 | 11/2006 | Walker et al. |
| 2006/0252505 | A1 | 11/2006 | Walker et al. |
| 2006/0264256 | A1 | 11/2006 | Gagner et al. |
| 2006/0264257 | A1 | 11/2006 | Jaffe et al. |
| 2006/0282855 | A1 | 12/2006 | Margulis |
| 2006/0284574 | A1 | 12/2006 | Emslie et al. |
| 2006/0287063 | A1 | 12/2006 | Walker et al. |
| 2006/0290594 | A1 | 12/2006 | Engel et al. |
| 2007/0004510 | A1 | 1/2007 | Underdahl et al. |
| 2007/0004513 | A1 | 1/2007 | Wells et al. |
| 2007/0010315 | A1 | 1/2007 | Hein |
| 2007/0015569 | A1 | 1/2007 | Norton et al. |
| 2007/0024002 | A1 | 2/2007 | McMain et al. |
| 2007/0032288 | A1 | 2/2007 | Nelson et al. |
| 2007/0043616 | A1 | 2/2007 | Kutaragi et al. |
| 2007/0060317 | A1 | 3/2007 | Martin |
| 2007/0105617 | A1 | 5/2007 | Walker et al. |
| 2007/0121936 | A1 | 5/2007 | Guillou et al. |
| 2007/0129137 | A1 | 6/2007 | Walker et al. |
| 2007/0155472 | A1 | 7/2007 | Gail et al. |
| 2007/0180400 | A1 | 8/2007 | Zotov et al. |
| 2007/0213124 | A1 | 9/2007 | Walker et al. |
| 2007/0243925 | A1 | 10/2007 | LeMay et al. |
| 2007/0243928 | A1 | 10/2007 | Iddings |
| 2007/0243934 | A1 | 10/2007 | Little et al. |
| 2007/0259709 | A1 | 11/2007 | Kelly et al. |
| 2007/0265060 | A1 | 11/2007 | Hornik et al. |
| 2008/0008188 | A1 | 1/2008 | Buga et al. |
| 2008/0009344 | A1 | 1/2008 | Graham et al. |
| 2008/0020816 | A1 | 1/2008 | Griswold et al. |
| 2008/0020839 | A1 | 1/2008 | Wells et al. |
| 2008/0020840 | A1 | 1/2008 | Wells et al. |
| 2008/0020841 | A1 | 1/2008 | Wells et al. |
| 2008/0026816 | A1 | 1/2008 | Sammon et al. |
| 2008/0039190 | A1 | 2/2008 | Walker et al. |
| 2008/0076574 | A1 | 3/2008 | Okada |
| 2008/0096655 | A1 | 4/2008 | Rasmussen et al. |
| 2008/0113747 | A1 | 5/2008 | Williams et al. |
| 2008/0125219 | A1 | 5/2008 | Williams et al. |
| 2009/0098943 | A1 | 4/2009 | Weber et al. |
| 2009/0104954 | A1 | 4/2009 | Weber et al. |
| 2009/0156303 | A1 | 6/2009 | Kiely et al. |
| 2009/0233705 | A1 | 9/2009 | LeMay et al. |
| 2009/0291736 | A1 | 11/2009 | Walker et al. |
| 2010/0105454 | A1 | 4/2010 | Weber et al. |

FOREIGN PATENT DOCUMENTS

| | | |
|---|---|---|
| EP | 0454423 | 10/1991 |
| EP | 0484103 | 5/1992 |
| EP | 0769769 | 4/1997 |
| EP | 0946028 | 9/1999 |
| EP | 0997857 | 10/1999 |
| EP | 1195184 | 4/2002 |
| EP | 1255234 | 11/2002 |
| EP | 1260928 | 11/2002 |
| EP | 1282088 | 2/2003 |
| EP | 1462152 | 9/2004 |
| EP | 1492063 | 12/2004 |
| EP | 1524617 | 4/2005 |
| GB | 1464896 | 2/1977 |
| GB | 2120506 | 11/1983 |
| WO | WO/98/52665 | 11/1998 |
| WO | WO/99/42889 | 8/1999 |
| WO | WO/99/44095 | 9/1999 |
| WO | WO/01/15127 | 3/2001 |
| WO | WO/01/15128 | 3/2001 |
| WO | WO/01/15132 | 3/2001 |
| WO | WO/01/09664 | 8/2001 |
| WO | WO02/055163 | 7/2002 |
| WO | WO/02/073501 | 9/2002 |
| WO | WO/03/023647 | 3/2003 |
| WO | WO/03/039699 | 5/2003 |
| WO | WO03/089082 | 10/2003 |
| WO | WO03/093986 | 11/2003 |
| WO | WO/2004/001486 | 12/2003 |
| WO | WO/2004/102520 | 11/2004 |
| WO | WO2005/070509 | 8/2005 |
| WO | WO/2006/033986 | 3/2006 |
| WO | WO/2006/034192 | 3/2006 |
| WO | WO/2006/038819 | 4/2006 |
| WO | WO/2006/039132 | 4/2006 |
| WO | WO/2007/032916 | 3/2007 |
| WO | WO/2007/040413 | 4/2007 |
| WO | WO/2007/120444 | 10/2007 |
| WO | WO/2007/120450 | 10/2007 |
| WO | WO/2008/061068 | 5/2008 |
| WO | WO/2009/009269 | 1/2009 |
| WO | WO/2009/036445 | 3/2009 |
| WO | WO/2009/140096 | 11/2009 |
| WO | WO/2009/143274 | 11/2009 |
| WO | WO/2010/056418 | 5/2010 |
| WO | WO/2010/120451 | 10/2010 |

OTHER PUBLICATIONS

James R. Hagarty, Judge's Ruling on Pop-Up Ads is a Blow to Web-Site Operators, Wall Street Journal, Monday Sep. 8, 2003, p. A3 and A5, 1 Page.
Michael McCarthy, Ads are here, there everywhere, USA Today, Jun. 19, 2001, 2 Pages.
Terry Lefton, Playing the Ad Market, The Industry Standard, Jul. 30, 2001, 1 Page.
Daisy Whitney, A 'TiVo-Proof' Ad Model, Vision Week, May 7, 2004, 2 Pages.
Curt Rist Should you ad go here?, http://money.cnn.com/2004/03/04/technology/business2_adds/, 4 Pages.
Jack Myers, Ourdoors Sets Sites on Doubling Share-of-Market with Research & Tech Upgrades, Jack Myers Report, Mar. 3, 2004, 3 Pages.

* cited by examiner

*Fig. 4*
Slot 1
Available AdLiner
Slot 2
HOMETOWN BBQ
BBQ Brisket Cheddar Melt $6.99
Slot 3
Applebee's
Order Applebee's Gift Certificates Today
It's The Gift of Good Taste
Slot 4
Applebee's
Try Our Delicious Onion Peels Served
with a Creamy Horseradish Dipping Sauce.
Slot 5
Available AdLiner
Slot 6
HOMETOWN BBQ
BBQ Stack Steak $6.99
Slot 7
Hit this hand between 5-7PM
WIN 10,000 Bonus Points
Slot 8
Available AdLiner
Slot 9
Available AdLiner
Slot 10
Available AdLiner
123456

CLOSED-LOOP SYSTEM FOR PROVIDING ADDITIONAL EVENT PARTICIPATION TO ELECTRONIC VIDEO GAME CUSTOMERS

RELATED APPLICATIONS

This application is a continuation-in-part of U.S. patent application filed on Oct. 20, 2003 with a title of CLOSED-LOOP SYSTEM FOR DISPLAYING PROMOTIONAL EVENTS AND GRANTING AWARDS FOR ELECTRONIC VIDEO GAMES and assigned Ser. No. 10/689,407 now U.S. Pat. No. 7,335,106.

FIELD OF THE INVENTION

The present invention relates generally to the electronic video gaming industry and, more particularly to providing a closed-loop system that allows an operator of an electronic gaming system to invite a customer to participate in an additional activity or event, or make an offer to a customer, while the customer is engaged with a video gaming machine.

BACKGROUND OF THE INVENTION

Electronic video games have come along way. In the early days, the Odyssey system allowed a user to tape one of several plastic see-through diagrams onto their television screen. Various diagrams were available, such as basketball, hockey, football and pong. However, the underlying game was the same—it was just a variation of the original Pong game. Today, highly complex, nearly real-life graphics are available and the game controllers have more buttons than the most advanced combined remote controls for televisions. The gambling gaming industry has capitalized on this growth. The standard mechanical slot machines of yesterday have converged with the growth in the electronic video gaming industry to introduce a new line of electronic video games. Some of the more popular outgrowths of this convergence are the video poker, black jack and video slot machines.

The gambling gaming industry has also capitalized on applying the growth in networking technology. Today, the electronic games are connected through a network to a main server that monitors the play of the games, the payouts awarded, and even the identity of the parties that are playing the game. The blue-haired ladies with buckets of quarters have been replaced with blue-haired ladies wearing a string around their necks that is connected to magnetic-strip identification card. The magnetic strip identification cards, in some cases simply identify the player but, in other cases operate as a pre-paid card and maintain a value based on the initial value loaded when the card is obtained, augmented by the success or failure of the user at the electronic game. Prior to commencing play, the card is swiped or entered into a slot on the machine and the identity of the player is extracted. In addition, the value loaded onto the card can be read and loaded into the machine. As play commences, the value can be decremented or incremented based on the gambling results. All of this information can be fed into the main server and recorded into a database.

One of the problems that the gambling gaming industry faces is dealing with the amount of traffic that is transmitted through the network. One technique that has been employed to reduce this traffic is to filter out all plays except for payout plays. For instance, in video poker, a payout list is provided on the display to indicate what hands will result in what payouts. Any hands that do not qualify as a payout are simply ignored. The hands that result in a payout result in a data entry being transmitted through the network to the main server. Although this technique provides a solution for reducing network traffic, it advantageously results in filtering out valuable information that could be used by the operators of the games. For instance, being able to track the number of times that a user has played the game, the frequency of starting new games, the characteristics of the user in playing the game and the reactionary speed of the players could be valuable information. Thus, there is a need in the art for a technique to capture this valuable information without over taxing the network bandwidth by introducing an abundance of network traffic.

Another disadvantage of this technique is that it limits the flexibility of the game operators in providing promotional events with the gaming machines. For instance, if an operator decides to run a promotional event in which video poker players will receive special awards for obtaining hands that are not included in the payout list, the main server has no mechanism in which to track the awards. In fact, this type of promotional event has proven to be a common technique used by video gaming machine operators to encourage play. Today these events are handled in the following manner. If an operator decides to award players with a special payback for an arbitrary hand, such as obtaining three or four clubs on Saint Patrick's day for video poker, or having a total of five on a black jack hand on Cinco De Mayo, or other non-standard hands, the operator announces the promotion either via an audio announcement, posters or a marquee that is visible to the players. If a player meets the criteria set forth in the promotion, the player approaches an employee of the casino, or the manager/bartender in a restaurant/bar setting, and gives them notice of the win. The employee or manager/bartender then serves as the sole point of contact for granting the award. It should be quite apparent that such a system is very vulnerable to "foul-play". One extra-generous bartender trying to help out a friend or impress an attractive lady can easily falsify records and grant the awards to undeserving parties.

Such promotional events have proven to be very beneficial to gambling machine operators; however, the lack of control in granting the awards results in millions of dollars being lost every year. Thus, there is a need in the art for technique that allows gambling machine operators to reap the benefits of providing promotional events while minimizing the risk of loss associated with the payout of awards for these events.

SUMMARY OF THE INVENTION

The present invention provides a closed-loop system for defining, monitoring and awarding promotional events in a variety of settings. In one embodiment, the invention includes a device that can be embedded within, or operate in conjunction with a video gaming machine. In this embodiment, the present invention operates to augment the display of a video gaming machine to provide the display of entertainment feeds, such as television, pay-per-view movies and advertisements, as well as provide for the display of information pertaining to promotional events. In addition, the present invention allows operators of the video gaming machines to customize the display of the video gaming machine and to program the types, durations and awards associated with promotional events. The closed-loop operation allows for the display of promotional events, other events and activities, messages, and other transactions on the screen of the video gaming machine, the monitoring the activity of the video gaming machine and the recording of information indicating that an award for a promotional event has been earned.

More specifically, the promotional events can include a variety of activities and be enhanced through the closed-loop or multi-directional communication capability of the present invention. Thus, the promotional event may include any type of transaction that may be desired to present to the player. For instance, the promotional event may include horse races, sporting events, lottery participation, commerce transactions, etc. In operation, a video gaming machine incorporating the controller box aspect of the present invention inserts video or information content to be displayed on the screen of the video gaming machine. The video or information content prompts or invites a player to participate in or place a bet on the promotional event. For instance, a pop-up window may invite a player to bet on a currently running boxing event. As another example, a pop-up window may invite a player to purchase an item at a discounted price.

Advantageously, the present invention enables an operator to track demographic information pertaining to the play of a particular video gaming machine including, but not limited to, the identity of the player, the frequency of play by that player, the amounts betted by that player, the level of risk or characteristic of play of that player, the reactionary speed of the player, and player strategy.

DETAILED DESCRIPTION

The present invention includes a device that can be embedded within, or operate in conjunction with a video gaming machine. Throughout this description, a video gaming machine will refer to all kinds of gambling machines, such as video poker, black jack, roulette, Keno and slot machines, as well as typical arcade video machines. More specifically, the present invention operates to augment the display of a video gaming machine to provide the display of entertainment feeds, such as television, pay-per-view movies and advertisements, as well as provide for the display of information pertaining to promotional events. Another aspect of the present invention is a system to allow operators of the video gaming machines to customize the display of the video gaming machine and to program the types, durations and awards associated with promotional events. Yet another aspect of the present invention is a closed-loop system that allows for the display of promotional events on the screen of the video gaming machine, monitor the activity of the video gaming machine and record information indicating that an award for a promotional event has been earned. Similarly, the closed-loop system aspect of the present invention allows for the display of a promotional event, transaction, or the like, and prompt and/or receive feedback or actions from a user of the video gaming machine that are provided in association with the promotional event or transaction. Yet another aspect of the present invention is to provide a technique for tracking demographic information pertaining to the play of a particular video gaming machine including, but not limited to, the identity of the player, the frequency of play by that player, the amounts betted by that player, the level of risk or characteristic of play of that player, the reactionary speed of the player, etc.

Advantageously, this invention will allow operators of video gaming machines to maintain control over promotional events and the granting of awards pertaining to those events, as well as extract valuable information that can be used in augmenting the play of these video gaming machines to increase profitability and increase play time.

Turning now to the figures in which like references and labels refer like elements, several embodiments of the present invention are provided.

Figure 1:
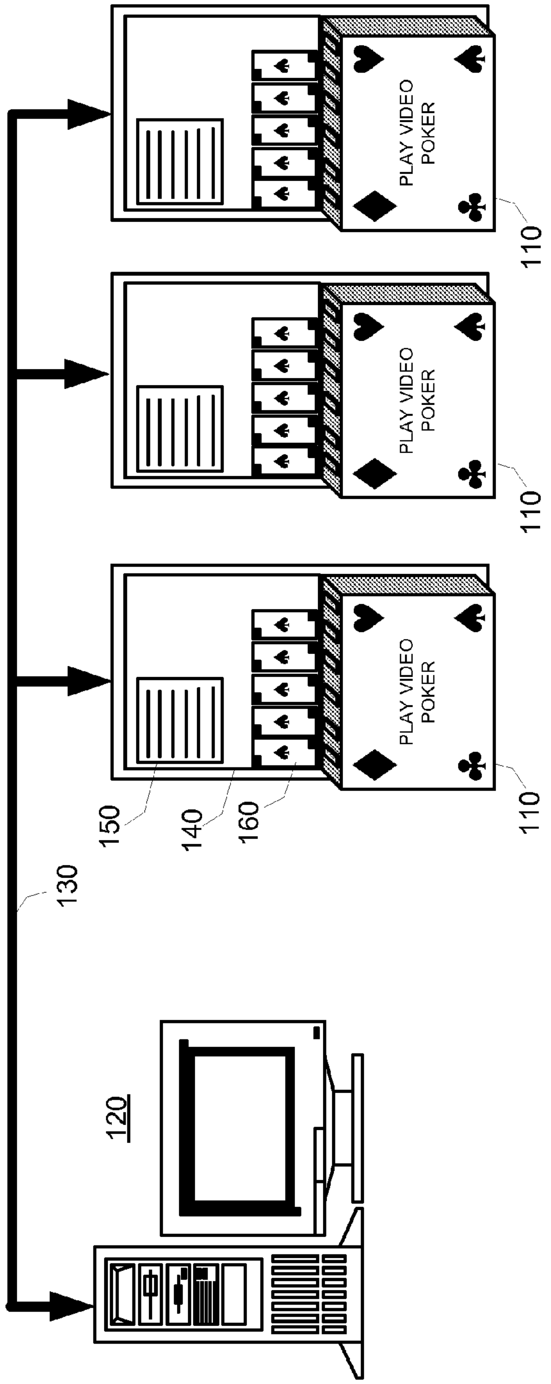
PRIOR ART Fig. 1
FIG. 1 is a system diagram illustrating the typical interconnectivity of a video gaming machine environment.

FIG. 1 is a system diagram illustrating the typical interconnectivity of a video gaming machine environment. One or more video gaming machines 110 are connected to an operator server 120 through an operator network 130. In the illustrated environment, the video gaming machines 110 are video poker machines but it will be appreciated that other video gaming machines could likewise be connected to the same network. Typically, all of the operator's video gaming machines are connected to the operator's network and it is not necessary for the video gaming machines to be co-located or even be on the same premises. For the illustrated video poker machines, a display 140 is provided with a variety of content including a payout table 150 and a card stack 160.

In operation, each time a winning hand is obtained (i.e., one that matches a hand on the payout table), a message is sent from the video gaming machine 110 to the operator server 120 over the operator network 130 or, the information maybe stored in the video gaming machine 110 or other memory storage device and the operator server 120 can periodically request or extract the stored information. Information is extracted from this message and stored into the operator server 120. The information may include, but is not limited to, the payout hand, the time and date the hand was achieved, the identity of the machine and the identity of the player. In the more modern video gaming machines, a magnetic card reader or equivalent device is included in the video gaming machine. The magnetic card reader can be used by players to insert a card that identifies the player and/or operates as a pre-loaded cash card to enable the game to be played.

Figure 2:
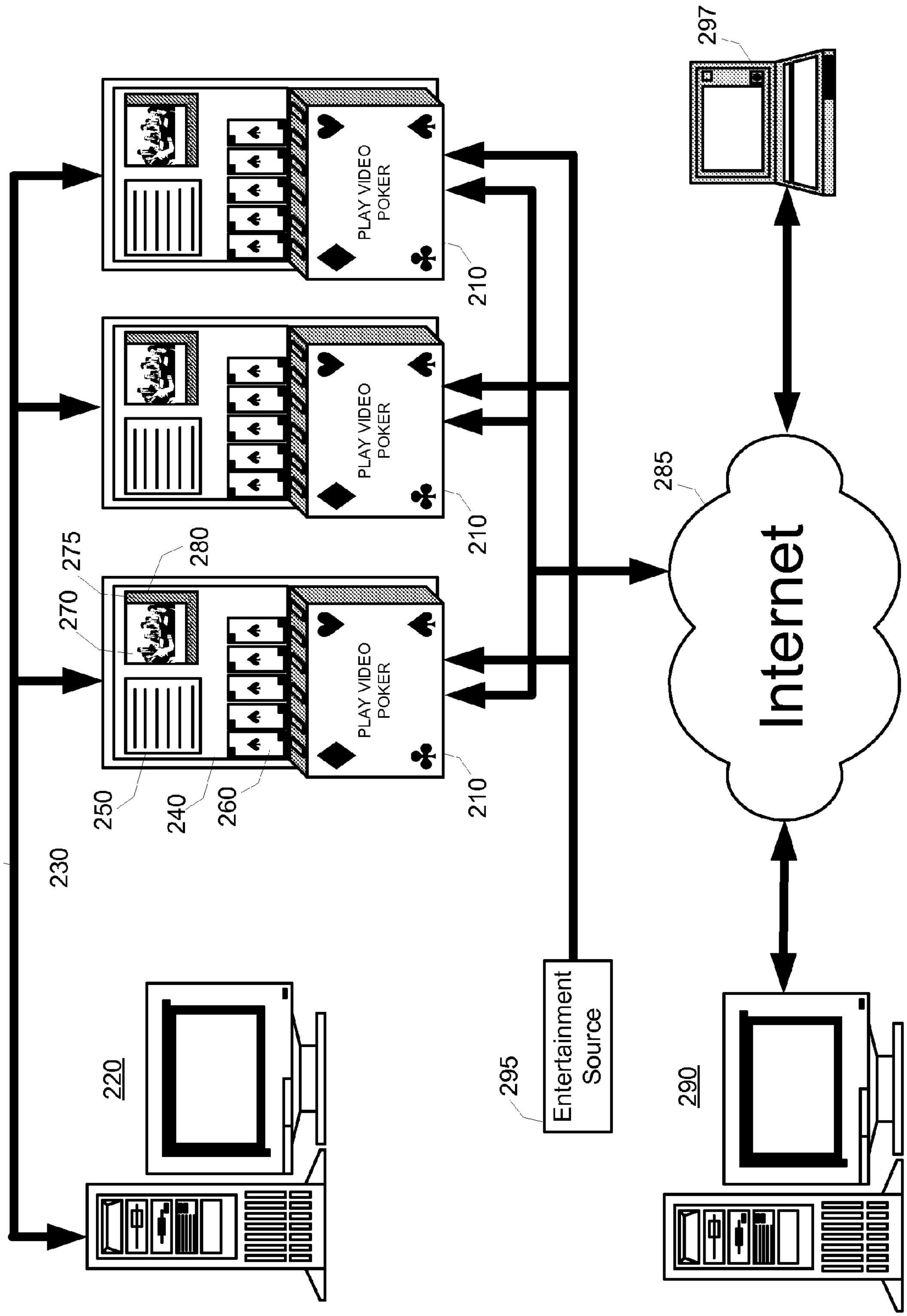
FIG. 2 is a system diagram illustrating the interconnectivity of a video gaming machine environment suitable for embodiments of the present invention.

FIG. 2 is a system diagram illustrating the interconnectivity of a video gaming machine environment suitable for embodiments of the present invention. One or more video gaming machines 210 are connected to an operator server 220 through the operator network 230. Again, in the illustrated environment, the video gaming machines 210 are video poker machines but it will be appreciated that other video gaming machines could likewise be connected to the same network. For the illustrated video poker machines, a display 240 is provided with a variety of content including a payout table 250 and a card stack 260. In addition, the present invention includes a section for the display of entertainment content 270 and/or promotional or advertising content 275. Each of the video gaming machines is equipped, either internally or externally, with a controller box 280. The controller box 280 is interconnected with a main processor or controller for the video gaming machine as well as being connected to a promotional server 290. The controller box 280 is illustrated as being connected to the promotional server 290 through a network 285 which may include the Internet, or some other public or private network. However, the promotional server 290 may connect to the controller boxes 280 through a dial-up connection, wireless connection, or dedicated lines as well. The controller boxes 280 are also connected to an entertainment source 295. The entertainment source could be a cable television feed, satellite feed, recorded information, internet or computer based application, another content system, an online or computer based store, or a variety of other sources.

In the embodiment illustrated in FIG. 2, the operations applicable to FIG. 1 are still in force and additional operations are added. The controller box 280 drives a portion of the display 240 by providing the entertainment content 270 and/or the advertising content 275.

The entertainment content 270 is provided to the display 240 by a feed from the entertainment content source 295 through the controller box 280. If the entertainment content source 295 includes multiple channels, the actual channel displayed can be controlled either through the controller box 280 or through the controller box 280 operating together with the promotional server 290. In some embodiments, the display 240 may be a touch sensitive screen. In these embodiments, the controller box 280 can also provide control buttons on the display 240 to allow a player to select a particular entertainment content channel, adjust the volume, hide the display, freeze the display, zoom in or out on the display, mute the audio, or the like. In other embodiments, special keys or buttons can be added to the machine, or existing keys or buttons can be redefined to facilitate this functionality.

It should be appreciated that the entertainment content may include a wide variety of content. For instance, the content may include horse races, sporting events, lottery participation, commerce transactions, etc. Thus, in operation, a video gaming machine incorporating the controller box aspect of the present invention inserts video or information content to be displayed on the display 240 of the video gaming machine. The video or information content prompts or invites a player to participate in or place a bet on the promotional event. For instance, in one embodiment of the invention, a player may be invited to participate in a sporting event. In this embodiment, the present invention operates to utilize at least a portion of the display 240 to indicate that the player may place a bet and/or view a sporting event. Buttons or actuators on the video gaming machine can then be defined as response buttons and monitored for player action. Thus, as an example a pop-up window may indicate that a sporting event is about to begin or is underway and ask the player if he or she would like to place a bet on the expected outcome and/or to view the event while at the video gaming machine. The window may define which buttons, levers or actuators on the video gaming machine may be used in response and then, monitor for any actuations. Thus, a player may hit one button to indicate he or she wishes to place a bet, another button to pass, and another button to indicate he or she wishes to view the event.

Figure 7:
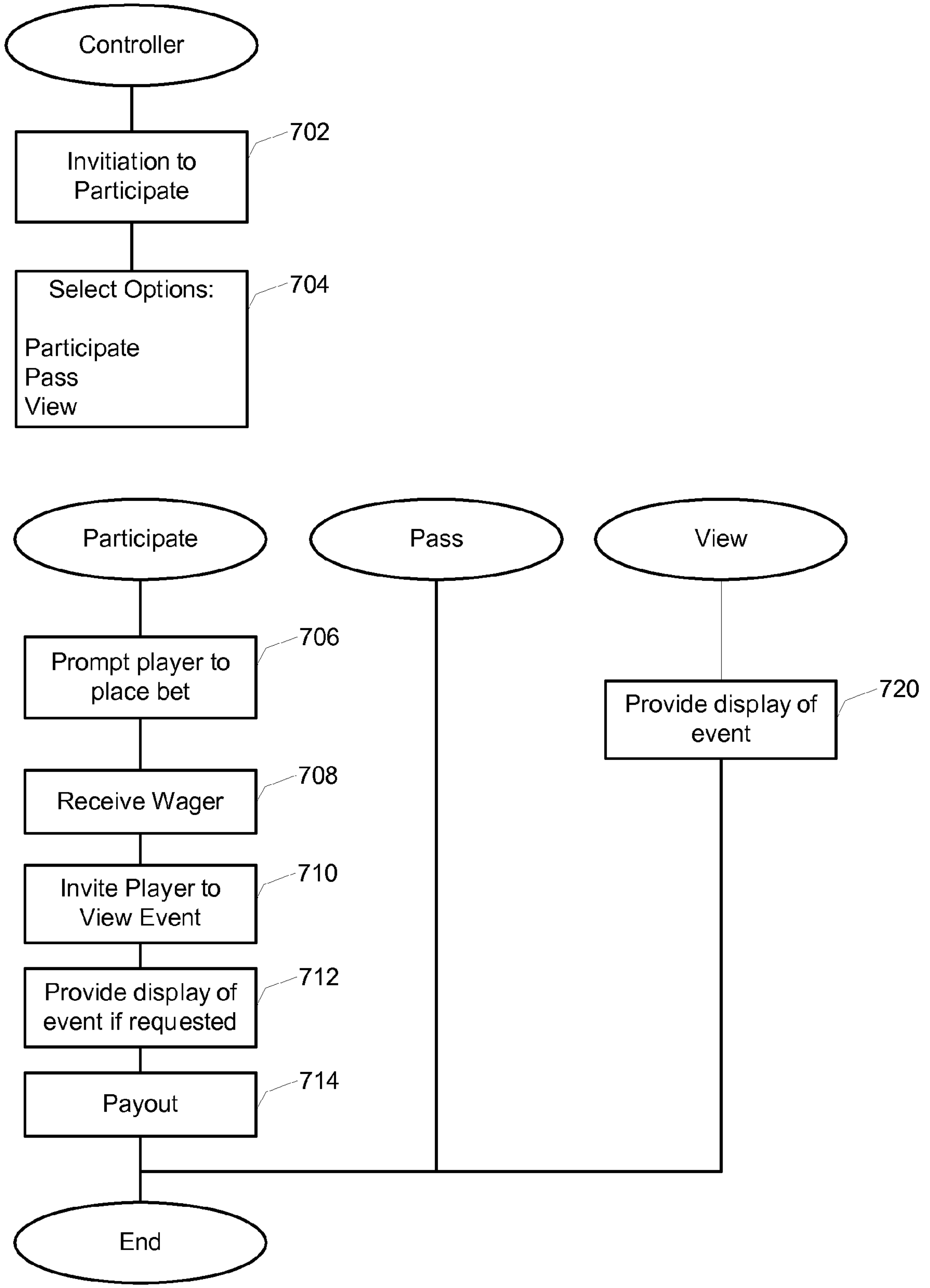
FIG. 7 is a flow diagram illustrating the steps involved in one embodiment of the promotional event aspect of the present invention.

FIG. 7 is a flow diagram illustrating the steps involved in one embodiment of the promotional event aspect of the present invention. Initially, the player is notified of the ability to participate in the event or is invited to participate in an event 702, such as through the use of a pop-up window appearing on the display of the video gaming machine. The player has several options at this point, such as indicating a desire to place a bet, passing, or simply watching the event 704. In other embodiments, the user may have additional options and the present example is a non-limiting application. If the player selects the option to participate, in an exemplary embodiment the player is presented with another screen or window indicating the options for placing the bet 706. For instance, the player may be able to wager (a) from the current balance held in the video gaming machine; (b) from the balance the player may have in a magnetic strip card; (c) enter a specific amount to be billed to his or her room or account number; (d) enter a credit card number or the like. The player then elects the manner and amount of the wager and the wager is received 708. Once the player places the bet, the player may be presented with the option to view the event or to return to playing the video machine (or both) 710. If the player elects to view the event, the event may be presented to the user on the video gaming machine display or an alternative viewing means (such as a handheld device) 712. Viewing the event may take on a variety of forms, including but not limited to, a live video feed of the event, a live audio feed, Once the event is over, if the player has gained an award, the award is distributed to the payer in one of a variety of manners 714. If the player is still using the video gaming machine, the player may simply be credited with the award by increasing the balance on the video gaming machine. Alternatively, the players magnetic card balance may be increased, the player may receive a notice to visit the cashier, the player's credit card may be credited, etc. It should be appreciated that the provision of this aspect of the present invention may be provided through the promotional server, the controller box, a separate device, or a combination of two or more of these devices.

Alternatively, the player may elect to pass on the ability to wager on the event or the player may simply request to view the event 720.

Thus, this aspect of the present invention may be used to invite a player to bet on a currently running boxing event. As another example, a pop-up window may invite a player to purchase an item at a discounted price. For instance, while the player is engaged in activity with a video gaming machine, the player maybe be prompted or invited to make a purchase in the casino gift shop, purchase tickets for an event at a discounted price, or to purchase and make reservations at a restaurant. In this example, the display presents an offer to the player and prompts the player to either accept or reject the offer. Alternative embodiments may allow the player to request further information, look at other offers, etc.

The present invention may also be used to invite a player to place a drink, dinner or other order to be delivered to the player at the video gaming machine. For instance, in one embodiment of the invention, if a player is active on a machine as a meal time is approaching, the player may be presented with a window inviting the player to order food services for delivery to the video gaming machine. The user may be presented with a menu from which he or she can select a meal. The meal can be immediately deducted from the players current balance in the machine, billed to the players room or credit card, or delivered on a COD type basis.

Another aspect of the present invention is to provide player specific messages. For instance, if a player uses a magnetic strip card to load value into the video gaming machine, the identity of the player is known. With this information, player specific messages can be provided to the player while he or she is using a video gaming machine. For instance, if the player has logged in a certain amount of time on the machine, the player may be invited to upgrade his or her room. Likewise, if a message is left for the player, or the player receives a telephone call, the present invention can be utilized to notify the player of such.

This aspect of the present invention can be provided using a variety or a combination of system or components. For instance, this aspect of the present invention may be embodied within a controller box 280 embedded or interfaced to the video gaming machine. In this embodiment, the controller box 280 interfaces to an external source for the promotional event, activity, offer, or the like, analyzes the same and formulates the presentation to the customer. In addition, the controller box 280 detects, receives and interprets all activities of the customer, monitors the event, activity or offer and provides or assists in all fulfillment activities. In such an embodiment, the controller box includes a display interface that can interface with the display system of the video gaming machine. Through the display interface, the controller box 280 can operate to display an invitation to the customer on the display of the video gaming device, thereby inviting the customer to participate in an event, provide status information pertaining to the event, and provide results information regarding the outcome of the event. The controller box 280 also includes an interface to one or more actuation devices on the video gaming machine to receive a response from a player indicating acceptance of the invitation, request for more information, acceptance of an offer, provision of funding information or the like. The controller box 280 also includes an interface to an event monitor for obtaining status information pertaining to the event. It should be appreciated that the present invention can be incorporated into other systems, such as a promotional server, or a combination of one or more systems.

The advertising content 275 is provided to the display 240 either by a feed from the entertainment content source 295 under the control of the controller box 280 or, from the promotional server 290 under the control of the controller box 280. For advertisement content from the entertainment feed, the operation is similar to that described for the entertainment content. However, for advertising content 275 from the promotional server 290, several innovative capabilities are provided. One such innovative capability is allowing the operator of the video gaming machines 210 to customize promotional events and advertise the promotional events on the display 240 of the video gaming machine 210. Another such innovative capability is enabling the play of the video gaming machine 210 to be monitored in view of the promotional event and control the granting of awards for the promotional event in a closed-loop manner.

The operator of the video gaming machines can customize the promotional events available on the video gaming machines 210 through the use of the promotional server 290. The operator can directly access the promotional server 290 or can access the promotional server through the network 285 from a remote machine 297. In practice, the promotional server 290 executes a software program that provides a programming functionality for promotional events. The actual configuration of the software program can vary between embodiments but in general, the software program includes, but is not limited to the following functionality:

(a) creation of content to display for promotional events;

(b) establishing schedule of promotional events; and (c) driving video gaming machines (Closed-loop Operation).

Creating Content for Promotional Events

Figure 3A:
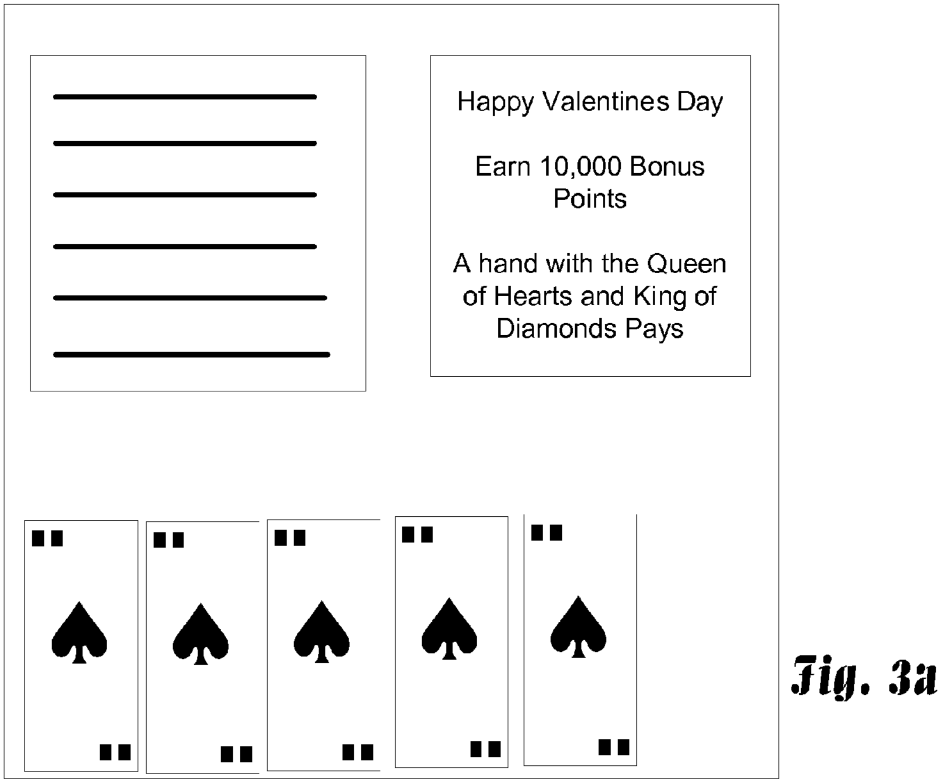
FIG. 3*a*-3*b* illustrate two exemplary displays to advertise a promotional event.
Figure 3B:
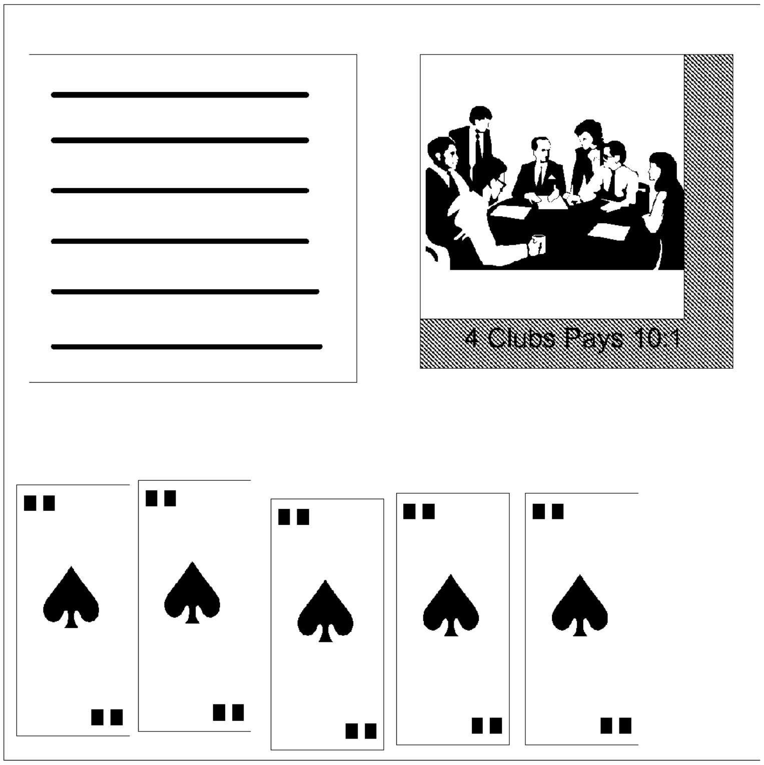

The operator creates content to display for a promotional event. The display of the content can vary from embodiment to embodiment. FIG. 3*a*-3*b* illustrate two exemplary displays to advertise a promotional event. The content could include graphics, text, moving video, audio or a combination of any of these. The promotional server 290 allows the content to be created either utilizing the software program or to be created elsewhere and imported into the promotional server 290. The promotional server 290 maintains a database of the promotional content and the scheduling information. The operator is able to create multiple displays for a variety of promotional events and store them into the promotional server 290 for current use or for later use. FIG. 3*a* shows a display format that encompasses the display area for both the entertainment content 270 and the advertising content 275. FIG. 3*b* shows a display format that encompasses only the display area for the advertisement content 275. Other configurations are also anticipated such as, but not limited to, flashing the entire display 240, scrolling across a portion of the display 240 and encompassing the entire display 240 for a period of time. Once the content has been created, the operator can establish a schedule for the promotional events.

Establishing a Schedule

Figure 4:
FIG. 4 is screen shot illustrating one embodiment of the playlist.

The operator establishes a schedule for the promotional events that can include, among other parameters, the date and time for the event, the duration of the event, and the display content to promote the event. In one embodiment, the schedule is presented in the form of a playlist. Each item in the playlist can be customized and scheduled. FIG. 4 is screen shot illustrating one embodiment of the playlist. The playlist consist of multiple slots (Slot 1-10 in this example) and can be spread out over multiple pages (page 1-6 in this example). In the illustrated embodiment, Slots 2-4 and Slot 6 hold advertising content. Slot 7 has been programmed to hold promotional content. Furthermore, the illustrated embodiment is implemented in mark-up languages and viewable through a standard browser, however, those skilled in the art will appreciate that the particular implementation language and/or technology, as well as the specific formats, look-and-feel and operations of the software program are independent of and not relevant to the particular operations of the described aspects of the present invention. Thus, although the remaining examples will be described as including particular operations that result in particular screen views, the present invention is not limited in such a manner.

To edit or create promotional content, the user selects the applicable Slot X hyperlink. For instance, if an operator desires to create the promotional event that is currently displayed in Slot 7, the operator selects Slot 7 and the resulting display is illustrated in FIG. 5.

Figure 5:
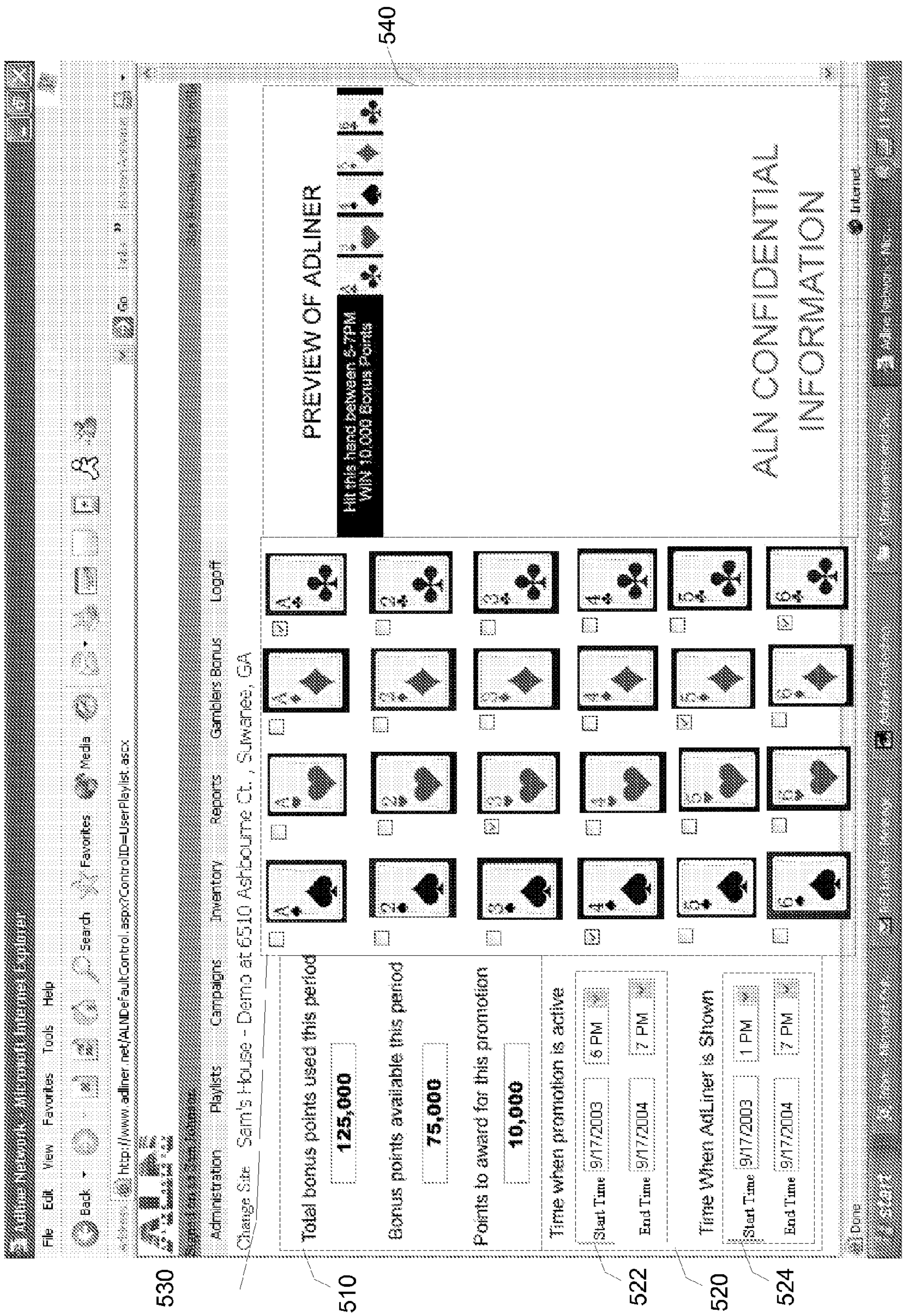
FIG. 5 is a screen shot illustrating the programming screen for promotional content.

FIG. 5 is a screen shot illustrating the programming screen for a promotional event. The programming screen includes a bonus area 510, a scheduling area 520, a promotional definition area 530 and a preview of the promotional content area 540. The bonus area 510 identifies the bonus points that have been awarded during a particular period of time. This feature allows the operator to keep track of the amount of bonus points that have been awarded. It should be appreciated that the bonus points can represent a variety of awards. For instance, in a gambling embodiment, the bonus points may translate directly into monetary units. In a gaming scenario, the bonus points may represent credits for additional play or can be redeemed for prizes. In a charitable situation, the bonus points may translate into bidding power for a silent auction. In a restaurant/bar setting, the bonus points may translate into discounts for food or beverages. It should be appreciated that additional uses could easily be identified for various scenarios. The bonus area 510 also identifies the bonus point available. This may represent the amount of bonus awards that the operator has remaining in his desired budget. For instance, for a particular period, an operator may budget bonus points and the budgeted amount will be the sum of the total bonus points awarded and the bonus points available for this period. The bonus area 510 also includes an editable field in which the operator can select the bonus points that will be awarded for a particular promotional event. In the illustrated embodiment, the operator has selected 10,000 bonus points. In one embodiment, the promotional event can be scheduled to run for a particular period of time and/or until a budgeted amount of bonus points have been awarded.

The scheduling area 520 includes two sub-areas, the promotion active time 522 and the promotion display active time 524. During the programmed promotion display active time, the promotional content identified in the promotional content area 540 will be available for display. During the programmed promotion active time the promotion will actually be in effect. In some embodiments, an additional field can be displayed and edited to allow the operator to select the duration of time that will be dedicated to the slot in which the promotional event is programmed. For example, each programmed slot may be allocated to be 15 seconds and be cycled on the display in a round-robin fashion. Thus, when actual time falls within the programmed display active time for the promotional event, the promotional content will be displayed in a periodic manner. It should be appreciated that priorities could be assigned to particular slots and that varying time frames can be allocated for various slots also.

The promotional definition area 530 allows the operator to define the particular winning criteria for the promotional event. In the illustrated embodiment, the operator has selected the following hand to constitute a win:

A♣ 3♥ 4♠ 5♦ 6♣.

The operator may also program "don't care" or "wild card" conditions also. For instance, on Valentines Day, the operator may run a promotion in which the following hands constitute a win:

Q♥ K♥ (don't care) (don't care) (don't care) or

Q♥ (wild card) (don't care) (don't care) (don't care) where a wild card is any card that is a heart.

Thus, a player that draws the Q♥ and the K♥ or any heart card in any hand during the active time for the promotion would be awarded the bonus points.

The preview of the promotional content area 540 indicates the content that will be displayed during the programmed program display active time. In some embodiments, multiple content formats can be provided and the operator can select from the various formats. In other embodiments, an operator may select multiple formats that can be cycled through or randomly selected during the programmed promotion display time. It should be appreciated that the software program can automatically generate the display content, allow an editing function so that the operator can customize the display content, or allow the operator to import display content created from another application.

Closed-Loop Operation

The present invention also provides for closed-loop operation. The closed-loop operation, in general, allows for the recording of events that satisfy the winning criteria and then reporting the win to the operator in a controlled and secure or reliable manner. Advantageously, this aspect of the present invention helps to reduce or eliminate fraud in the awarding of bonus points to players.

In operation, the controller box 280 interfaces to the processor of the gaming machine 210 and to the promotional server 290. The controller box monitors activity information pertaining to the operation of the gaming machine. Although the gaming machines typically filter out hands that are transmitted over the network 130 to the operator server 120, the gaming machines 210 still include the logic to identify the hands that are not classified as winning hands on the payout table 250. The controller box 280 interfaces with the processor to identify all hands that are dealt.

This aspect of the present invention advantageously enables the monitoring and tracking of a variety of demographic information. For instance, in a video poker game environment, the controller box 280 can monitor and track the operations of a player, such as hands dealt, cards held, cards discarded, etc. This information could be used for a variety of purposes including identifying unsophisticated players that may need to attend a help session or players that are trying to trick the machine.

The present invention also includes the ability for the player to interact with the gaming machine 210 in response to the promotion. For instance, during a promotion, or even during standard play, the present invention can operate to display a message to the player to prompt for an action, and then provide an award based on that action. One example is to display a message directed towards a particular gaming machine 210 or a particular player, or a message directed across multiple gaming machines 210. A typical message could state that the first 50 players to perform a particular task will receive an award. The particular task could be a variety of different tasks, including but not limited to, pressing a certain button on the gaming machine 210, playing an additional round on the gaming machine 210, betting a certain amount, betting a threshold amount for a given number of hands, and cashing in a requested number of bonus points. The award could also be a variety of things, such as a coupon for a $2.00 steak dinner, a 10% discount at the gift shop, or a free round of golf with the purchase of a round. Depending on the particular embodiment, the players responding to the prompt may receive a printed receipt generated by the gaming machine 210, have the coupon recorded onto a magnetic strip of a card, receive a token, be requested to enter identification information into the gaming machine that can later be used to verify the win, or the machine can simply sound a bell or flash a light to get the attention of a game room attendant that can provide the coupon to the player.

In another example, the message may state that a player can exchange points or perform tasks to view pay-per-view content. The response time for performing the task may be restricted (i.e., in the next 5 minutes or immediately) or may be conditional on other attributes such as betting amounts, playing time, or the like. In one embodiment, while the promotional message is displayed, the player can respond by touching the displayed promotion on a touch sensitive screen. A confirmation message will then appear to verify that the player wants to exchange points, or pay for the reception of the pay-per-view content. In one embodiment, the gaming machine can print out a ticket that the player can use to access the pay-per-view content. In another embodiment, the pay-per-view content may directly appear on the gaming machines screen. In this embodiment, the player may be required to meet certain playing thresholds to keep the pay-per-view content on the screen (i.e., minimum number of bets per hour, betting a minimum amount).

Another variation on promotional events that can be implemented in an embodiment of the present invention is a tiered promotion. The tiered promotion requires a player to opt-in to a promotion. In operation, a promotional message is provided to the player indicating that the player can pay an additional fee (i.e. points or money) to win a chance at 10,000 additional bonus points if they meet certain win criteria. Such a promotion could be limited on a per session basis In one embodiment, the promotional server 290 may download into the controller box 280 all of the information regarding the scheduling of advertisements and promotional events. In this embodiment, the controller box 280 operates to control the display and timing of the display. In addition, during the programmed promotion active time, the controller box 280 will monitor for hands that meet the winning criteria. Once a winning hand is identified, the controller box 280 will notify the promotional event server 290 and provide any necessary information such as, but not limited to, the identity of the video gaming machine 210, the identity of the player, the time and date and the particular hand that satisfies the criteria.

In another embodiment, the controller box 280 may operate more similar to a dummy terminal. In this embodiment, the promotional event sever 290 is responsible for controlling the timing and content of the display and continuously downloads the necessary information to the controller box 280. The controller box 280 then controls the actual display of the content onto the display screen 240 of the video gaming machine 210. The controller box 280 then sends information to the promotional event server 290 for every hand that is dealt and the promotional event server 290 monitors the hands to identify when winning criteria has been met.

It should be appreciated that these two embodiments are just two illustrative embodiments as to how the processing power for the closed-loop system can be allocated. Those skilled in the art will appreciate that the actual processing power attributed to the various tasks can be allocated between the controller box 280 and the promotional event server 290 in a variety of fashions and the present invention is not limited to any particular configuration. In fact, all of the functionality can be incorporated into either the controller box 280 or the promotional event server 290 and totally eliminate the need for the other device.

Ultimately, the promotional event server 290 obtains the information necessary to identify the player and the award that has been earned by the player. The operator can extract this information directly from the promotional event server 290, by accessing the promotional event server 290 through the network, or the promotional event server 290 may also include a direct or indirect interface to the operator server 120 over which the promotional event server 290 uploads the information.

Thus, it should be evident that the present invention eliminates the risk of loss associated with the current art in which the operator is dependent upon the integrity of an employee or any other party that would ordinarily be responsible for being approached by a player purporting to have qualified as a winner, who then must physically visit the particular gaming machine 210 to observe the display, and then record the information and report that information back to the operator.

Figure 6:
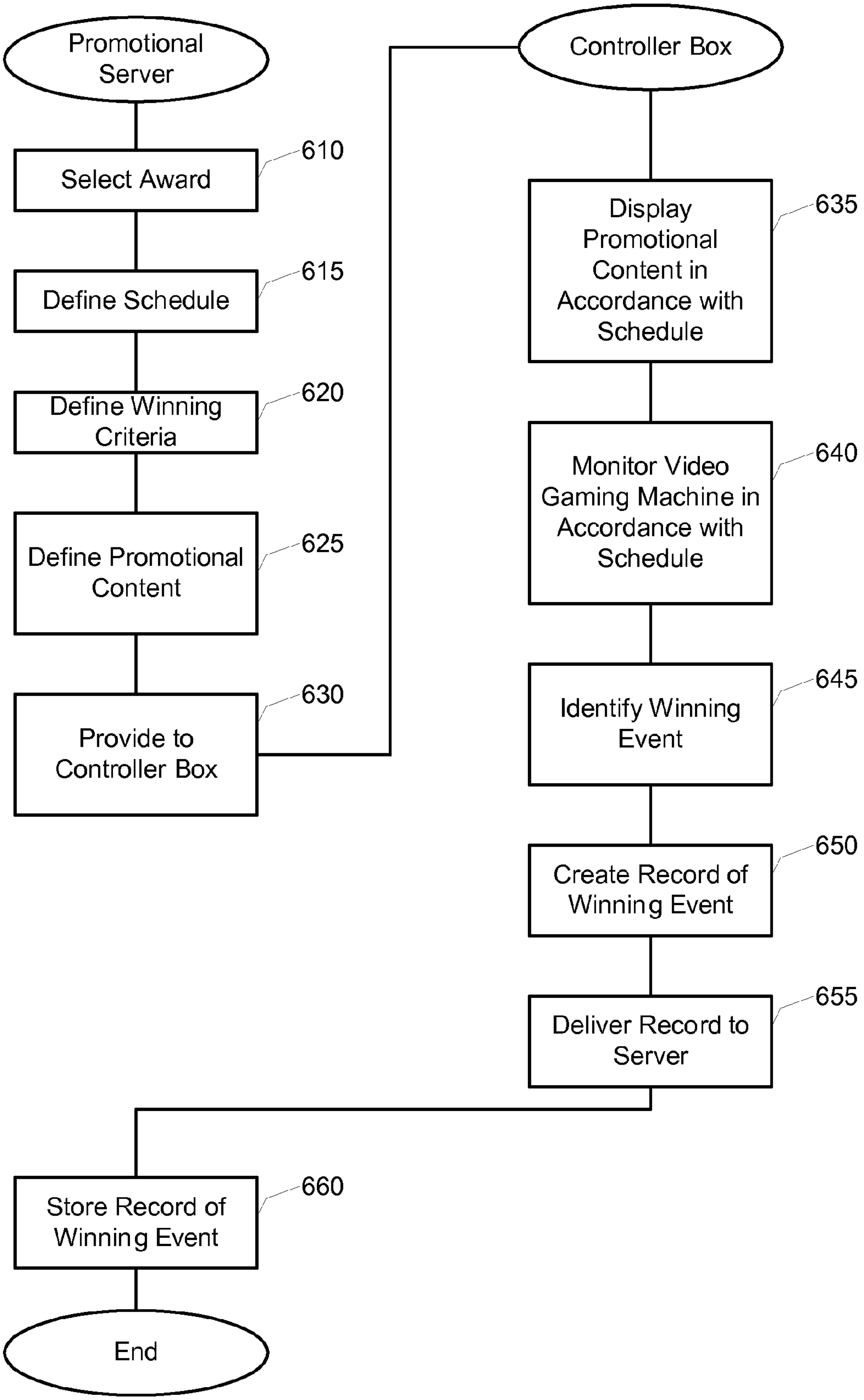
FIG. 6 is a flow diagram summarizing the operations of the promotional server and the controller box.

FIG. 6 is a flow diagram summarizing the operations of the promotional server and the controller box. At step 610, the operator using the promotional server identifies the award to be associated with a new promotional event. At step 615, the operator defines the schedule for the promotional event. The schedule includes at least two components. One component is the time period that advertising content for the promotional event will be displayed. The other component is the actual time period during which the promotional event will be active. In some embodiments these two time periods can be identical thus eliminating the need to program two time periods. At step 620, the operator defines the winning criteria. In the embodiment illustrated in FIG. 5, this step includes selecting the cards to be included in the winning hand. However, this step can vary greatly depending on the embodiment of the invention. For instance, in a restaurant setting, this step may include identifying a menu item. At step 625, the operator defines the promotional content to be displayed for advertising the promotional event. This step could involve importing a graphic or text file from another source or actually defining the art work. At step 630, the information pertaining to the promotional event is provided to the controller box 280.

It should be appreciated that multiple promotional events can be scheduled and loaded into the controller box 280. In fact, multiple promotional events can be concurrently active. The controller box can receive a download of all scheduled promotional events and at step 635, the controller box displays the advertising content pertaining to the promotional events in accordance with the schedule associated with the promotional events. Alternatively, the promotional server may only download information to the controller box when the information is active. At step 640, the controller box monitors the activity of the gaming machine in accordance with the schedule associated with the active time period for the promotional event. At step 645, the controller box 280 identifies that the criteria for a winning event has been satisfied. At step 650, the controller box 280 creates a record regarding the winning event. Depending on the particular embodiment, the content in this record can vary greatly. Typical embodiments will include information such as, but not limited to, the identity of the gaming machine, the identity of the player, the time and date of the winning event, the winning event, the identification of the promotional event, the address of the gaming machine, the location of the gaming machine, etc. In some embodiments, the controller may include a GPS signal receiver that can be used to identify the location of the gaming machine. At step 655, the record is delivered to the promotional server 290.

It should be appreciated that the present invention also enables the reporting of other activity that is not necessarily associated with a promotional event. For instance, the operator may want to establish a maintenance schedule for the equipment based on particular criteria. The present invention can be used to define such criteria and monitor for the satisfaction of the criteria. For instance, such criteria could include events such as hours of usage, number of key presses, number of key presses for particular keys, detection of operating errors, detection of loss of power, or the like.

The present invention could also be used to identify the amount of financial exposure an operator has with his currently running promotions. For instance, if a budget has been set for the promotion, the system can monitor the payouts that have been awarded during the promotional event and, based upon this information the operator or the system can make decisions to limit or expand the duration or winning criteria of the promotion. Likewise, the operator can allocate additional bonus points to the budget, or further limit the budget of a promotional event based on the operator's historical business performance with the promotion.

From the information obtained through the use of various embodiments of the present invention, the success or failures of certain promotions can be analyzed. This analysis can be used to identify particular attributes that may have contributed to the success or failure of the promotion. For instance, the duration of the promotion, the time of day the promotion was run, the date of the promotion, the amount of awards available for the promotion and the winning criteria of the promotion are several attributes that can be monitored and tracked to determine what effect, if any, these attributes have on driving the behavior of the players. As an example, an operator may determine that a particular promotion that runs in the morning may be more likely to generate playing time from players than is generated when the promotion is run in the evening.

The promotional server 290 stores received records at step 660 and maintains a database of records received from the controller box 280. It should be appreciated that the promotional server 290 can support many controller boxes 280 for many different operators. Thus, the promotional server 290 includes a security mechanism to restrict access to records and files. Such security mechanism may be password protection, or may include more advanced security techniques that should be familiar to those skilled in the art.

Operation in Other Settings

Although the present invention has been described with particular reference to a gaming or gambling scenario, the present invention, or aspects of the present invention, may be equally applied in a variety of other settings. For instance, in a restaurant setting, aspects of the present invention can be used to display special events within the restaurant. Thus, if a restaurant owner wants to promote a particular item on the menu, the restaurant owner may program a promotional event to be displayed on monitors within the restaurant. One example of such an event may be that a 20% discount is available to any patrons ordering the chicken fried steak during a particular period of time or day. In the typical restaurant setting, this embodiment is dependent upon accurate reporting by the waiter or waitress, however, in this embodiment; the integrity afforded by the closed-loop system is not as important as in the gambling scenario.

The present invention can also be used for performing management or controlling functions in various environments. For instance, in the restaurant setting again, various criteria can be entered as the basis of "winning events" where the winning events define particular management or control events. For instance, winning events may be defined to monitor inventory levels. In this scenario, if the inventory of a particular item drops below a particular threshold, it may trigger a reorder message. As another example, if the inventory for a perishable item is in stock beyond a certain date or time period, a message can be triggered to identify that item as being expired. As yet another example, the winning event may identify a particular product and the ingredients of that product. In this scenario, a message can be triggered based on the duration that the product should exist on the shelf or be available to patrons prior to the expiration. In addition, a message may be triggered to indicate that the inventory of ingredients to create this product has decreased beyond a particular threshold. Other criteria that can be included in this scenario could be the historical pattern of the pace of selling this product. In each of these scenarios, the generated messages can be displayed on a monitor or sent to a communication device to notify the responsible parties.

The present invention could also be incorporated into a bowling alley scenario. In this embodiment, the controller box 280 interfaces to the scoring control mechanism for the bowling alley. On the individual scoring screens, various promotional events can be displayed, such as, hitting a strike between the hours of 3 pm to 4 pm will award a free game to the bowler.

In the description and claims, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. It will be appreciated that other uses of the present invention are also anticipated. The described embodiments comprise different features, not all of which are required in all embodiments of the invention. Some embodiments of the present invention utilize only some of the features or possible combinations of the features. For instance, the controller box 280 has been described as interfacing to the processor and display of a particular machine. In some embodiments, the display and the processor may be totally independent. And example of such a scenario would be in a setting that the display includes a television or video monitor and the controller box 280 monitors activity of an independent device such as a juke box, trivia machine, point-of-sale terminal or arcade machine. Variations of embodiments of the present invention that are described and embodiments of the present invention comprising different combinations of features noted in the described embodiments will occur to persons of skilled in the art. The scope of the invention is limited only by the following claims.

What is claimed is:

1. A method of operating a gaming system, the method comprising:

(a) causing a promotional server interfaced with a controller box to identify a promotional sporting event betting opportunity to offer to a customer playing at least one displayed game on a video gaming machine interfaced with the controller box, wherein the controller box and the promotional server each operate independent of any outcome determinations of any displayed plays of any games on the video gaming machine;

(b) causing the promotional server to provide an invitation to the customer to participate in the identified promotional sporting event betting opportunity by causing an invitation message to be displayed on a particular portion of a display device of the video gaming machine, wherein said displayed invitation message does not disrupt any displayed plays of any games of the video gaming machine;

(c) receiving, via an actuator monitored by the controller box, a response from the customer, said response indicating a selection of one from the group consisting of: an acceptance of the invitation, a rejection of the invitation, a request for further information concerning the identified promotional sporting event betting opportunity, a request to view at least one other promotional sporting event betting opportunity, and a request to receive an invitation to participate in another promotional sporting event betting opportunity; and (d) upon acceptance of the invitation to participate in the identified promotional sporting event betting opportunity:

(i) causing the promotional server to request funding information from the customer by causing a funding request message to be displayed on the particular portion of the display device of the video gaming machine, wherein said displayed funding request message does not disrupt any displayed plays of any games of the video gaming machine, (ii) causing the promotional server to receive the funding information, said received funding information being in addition to any wagers placed on any displayed plays of any games on the video gaming machine; and (iii) causing any promotional sporting event award associated with the promotional sporting event betting opportunity to be provided to the customer.

2. The method of claim 1, wherein:

the promotional server identifies the promotional sporting event betting opportunity to offer to the customer by enabling a user to define the plurality of parameters of the promotional sporting event betting opportunity by selecting from a group consisting of: a sporting event date, a sporting event time, a sporting event display content, a sporting event payout and a winning criteria, the invitation message indicates the nature of the promotional sporting event betting opportunity, and accepting the invitation includes placing the bet on an outcome of the sporting event.

3. The method of claim 2, wherein requesting funding information includes:

requesting the customer to enter a bet amount; and requesting the customer to enter information defining a funding source.

4. The method of claim 3, wherein receiving funding information includes receiving a request to fund the bet from a current balance on the video gaming machine.

5. The method of claim 1, wherein the promotional server identifies the promotional sporting event betting opportunity to offer to the customer by enabling a user to define the parameters of the promotional sporting event betting opportunity by selecting from a group consisting of: a sporting event date, a sporting event time, a sporting event display content, and a sporting event acceptance criteria.

6. The method of claim 5, wherein receiving funding information includes receiving a request to fund the promotional sporting event betting opportunity by billing a hotel room associated with the customer.

7. The method of claim 1, which includes:

enabling multiple promotional sporting event betting opportunities to run simultaneously;

monitoring the multiple promotional sporting event betting opportunities to identify multiple outcomes; and providing further feedback to the customer based on the multiple outcomes of the multiple promotional sporting event betting opportunities.

8. The method of claim 7, wherein the video gaming machine includes a wager-based game.

9. The method of claim 8, wherein requesting funding information includes:

requesting a bet amount; and requesting a funding source.

10. The method of claim 9, wherein receiving funding information includes receiving a request to fund the bet from a current balance on the video gaming machine.

11. The method of claim 10, wherein providing further feedback to the customer based on the outcome of the sporting event includes notifying the customer of any winnings associated with the outcome of the sporting event.

12. The method of claim 10, wherein providing further feedback to the customer based on the outcome of the sporting event includes notifying the customer of any winnings associated with the outcome of the sporting event obtained and directly crediting the video gaming machine based on such winnings.

13. The method of claim 1, wherein the video gaming machine includes a wager-based game, and wherein the promotional sporting event betting opportunity is independent of the displayed play of the wager-based game.

14. The method of claim 13, wherein requesting funding information includes:

requesting the customer to enter a bet amount; and requesting the customer to enter information defining a funding source.

15. The method of claim 14, wherein receiving funding information includes receiving a request to fund the bet from a current balance on the video gaming machine.

16. A closed-loop customer participation event system comprising:

a promotional server configured to:

provide an interface configured to, for each of a plurality of promotional sporting event betting opportunities: define a type of promotional sporting event betting opportunity, define a schedule of the promotional device and define a duration of the promotional sporting event betting opportunity, and monitor active promotional sporting event betting opportunities that are offered on a video gaming machine, wherein at least two promotional sporting event betting opportunities are simultaneously active;

a plurality of controller boxes, each controller box being interfaced to the video gaming machine without disrupting any displayed plays of any games of the video gaming machine, wherein each controller box and the promotional server operate independent of any outcome determinations of any displayed plays of any games on the video gaming machine and each controller box includes:

a display interface configured to, without disrupting any displayed plays of any games of the video gaming machine, display to a customer on a particular portion of a display device of the video gaming device:

(i) an invitation inviting the customer to participate in one of the promotional sporting event betting opportunities, the invitation including an election of one selected from the group consisting of: to accept participation in the promotional sporting event betting opportunity, to reject participation in the promotional sporting event betting opportunity, to receive status information pertaining to the promotional sporting event betting opportunity, to view at least another one of the plurality of promotional sporting event betting opportunities, and to accept participation in the at least one other one of the promotional sporting event betting opportunities, and (ii) information regarding an outcome of the sporting event, any award associated with the outcome of the sporting event, and the at least one other one of the plurality of sporting events;

an interface configured to monitor at least one actuation device of the video gaming machine to receive responses from the customer indicating the customer's election of the acceptance of the invitation and funding information, said received funding information being in addition to any wagers placed on any displayed plays of any games on the video gaming machine; and an interface to the server configured to obtain status information pertaining to the promotional sporting event betting opportunity.

17. The system of claim 16, which includes an entertainment source that provides a live video feed of the sporting event to the controller box for display onto the display device of the video gaming machine.

18. The system of claim 16, wherein:

the promotional server is further operative to provide a user interface configured to enable a user to define a plurality of parameters of each promotional sporting event betting opportunity by selecting from a group consisting of: a sporting event date, a sporting event time, a sporting event display content, and a sporting event acceptance criteria;

the controller box can activate the promotional sporting event betting opportunities based on the scheduled sporting event date and the scheduled sporting event time; and the response to the defined promotional sporting event betting opportunities can be assessed by observing user responses to the promotional sporting event betting opportunities at the gaming machines.

19. A method of operating a gaming system, the method comprising:

(a) causing a promotional server to provide a user interface which enables a user to define a plurality of parameters of each of a plurality of promotional sporting event betting opportunities by selecting parameters from the group consisting of: a sporting event date, a sporting event time, a sporting event display content, and a sporting event acceptance criteria;

(b) causing the promotional server to provide information to a controller box regarding an invitation to a customer to participate in one of the promotional sporting event betting opportunities prior to the sporting event date and the sporting event time, wherein the controller box and the promotional server each operate independent of any outcome determinations of any displayed plays of any games on a video gaming machine;

(c) causing the controller box to place an event invitation message on a display device of the video gaming machine based on the sporting event date and the sporting event time;

(d) causing the controller box to detect a response from the customer indicating an election selected from a plurality of elections consisting of: an acceptance of the invitation, a rejection of the invitation, an election to receive further information pertaining to the promotional sporting event betting opportunity, an election to view at least another one of the promotional sporting event betting opportunities, and an election to request an invitation to the at least one other promotional sporting event betting opportunity, by detecting the actuation of an actuator by the customer;

(e) causing the controller box to provide information regarding the detection of the election to the promotional server; and (f) if the customer elected to accept the invitation to participate in one of the promotional sporting event betting opportunities:

(i) causing the promotional server to provide information to the controller box identifying funding options to be offered to the customer for funding participation in the elected promotional sporting event betting opportunity, (ii) causing the controller box to place a funding options message on the display device of the video gaming machine regarding a plurality of funding options, (iii) causing the controller box to detect a selection of one of the plurality of funding options from the customer by detecting the actuation of an actuator by the customer, said selected funding option being in addition to any wagers placed on any displayed plays of any games on the video gaming machine, (iv) causing the controller box to provide information regarding the detection of the selection of the funding option to the promotional server, (v) causing the promotional server to provide information to the controller box pertaining to a status of the elected promotional sporting event betting opportunity, (vi) causing the controller box to place a status message on the display device of the video gaming machine regarding the status of the elected promotional sporting event betting opportunity, and (vii) causing an award associated with an outcome of the sporting event of the elected promotional sporting event opportunity to be provided to the customer.

20. The method of claim 19, wherein providing funding options includes:

providing a request for a bet amount; and providing a request a funding source.

21. The method of claim 19, wherein receiving funding information includes receiving a request to fund a bet from a current balance on the video gaming machine.

* * * * *